United States Patent
Neyedly et al.

(10) Patent No.: US 12,330,863 B2
(45) Date of Patent: Jun. 17, 2025

(54) MODULAR BI-LEVEL STORAGE AND TRANSPORT ASSEMBLY WITH COLLAPSIBLE FRAME (MTA)

(71) Applicant: Aero Marine Systems, Inc., Brooksville, FL (US)

(72) Inventors: Ross James Neyedly, Calgary (CA); Edward Chester Lewis, Navarre, FL (US)

(73) Assignee: Aero Marine Systems, Inc., Brooksville, FL (US)

( * ) Notice: Subject to any disclaimer, the term of this patent is extended or adjusted under 35 U.S.C. 154(b) by 231 days.

(21) Appl. No.: 18/156,291

(22) Filed: Jan. 18, 2023

(65) Prior Publication Data
US 2024/0239596 A1    Jul. 18, 2024

(51) Int. Cl.
| | |
|---|---|
| B65D 88/12 | (2006.01) |
| B65D 88/00 | (2006.01) |
| B65D 88/14 | (2006.01) |
| B65D 88/24 | (2006.01) |
| B65D 88/52 | (2006.01) |
| B64D 37/04 | (2006.01) |

(52) U.S. Cl.
CPC ........... *B65D 88/129* (2013.01); *B65D 88/00* (2013.01); *B65D 88/14* (2013.01); *B65D 88/24* (2013.01); *B65D 88/524* (2013.01); *B64D 37/04* (2013.01)

(58) Field of Classification Search
CPC ...... B65D 88/129; B65D 88/00; B65D 88/14; B65D 88/24; B65D 88/524; B65D 88/52; B65D 90/205; B64D 37/04; B64D 1/08; B64D 1/14
See application file for complete search history.

(56) References Cited

U.S. PATENT DOCUMENTS

| | | | | |
|---|---|---|---|---|
| 3,684,122 A * | 8/1972 | Bonomi | ............... | B65D 88/522 220/1.5 |
| 4,214,669 A * | 7/1980 | McQuiston | .......... | B65D 88/524 220/6 |
| 4,388,995 A * | 6/1983 | Ahn | ...................... | B65D 88/524 220/1.5 |
| 4,577,772 A * | 3/1986 | Bigliardi | ............... | B65D 88/524 220/6 |
| 5,190,179 A * | 3/1993 | Richter | ............... | B65D 90/008 220/6 |
| 11,618,488 B2 * | 4/2023 | Kim | ...................... | B65D 88/52 220/1.5 |
| 2012/0248105 A1 * | 10/2012 | Leong | ..................... | E05B 83/02 220/6 |
| 2014/0183186 A1 * | 7/2014 | Buskermolen | ......... | B65D 88/52 220/6 |
| 2014/0263306 A1 * | 9/2014 | Brennan, Jr. | ...... | B65D 90/0026 16/221 |
| 2016/0090234 A1 * | 3/2016 | Ronstadt | ............... | B62D 33/08 220/6 |

* cited by examiner

*Primary Examiner* — Kareen K Thomas
(74) *Attorney, Agent, or Firm* — Baker Botts L.L.P.

(57) ABSTRACT

In one embodiment, a modular bi-level storage and transport assembly (MTA) includes an upper rigid layer and a lower rigid layer and an adjustable support mechanism, coupled to the upper and lower rigid layers. Furthermore, the support mechanism is operable to expand to increase the distance between the layers, expanding the MTA and forming a space for a containment vessel, and to contract to reduce the distance between the layers, collapsing the MTA.

31 Claims, 24 Drawing Sheets

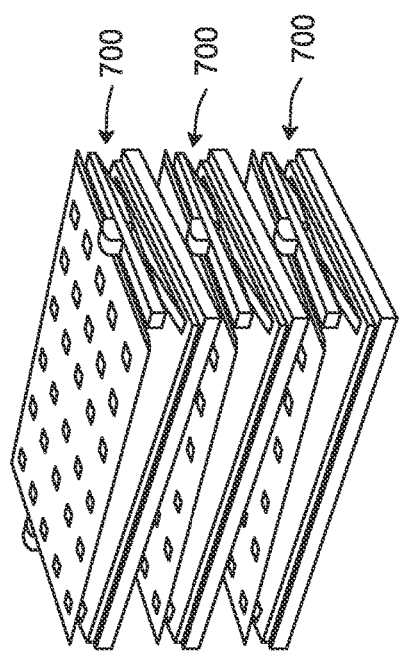
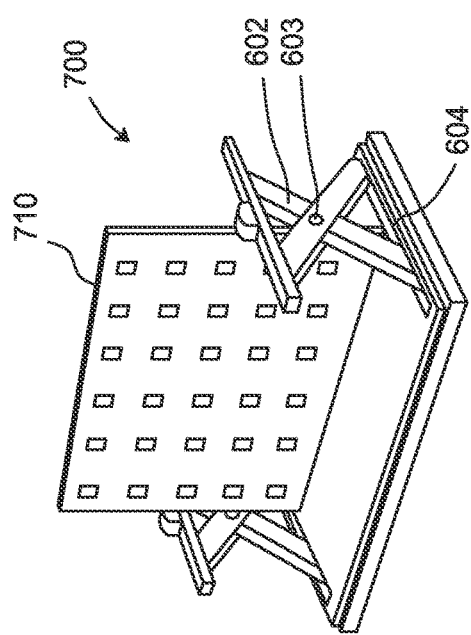
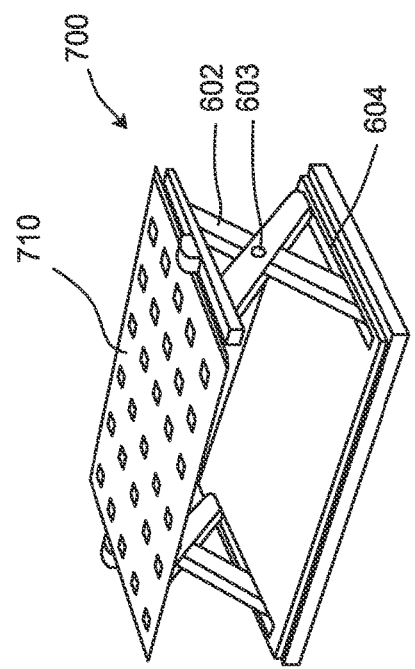

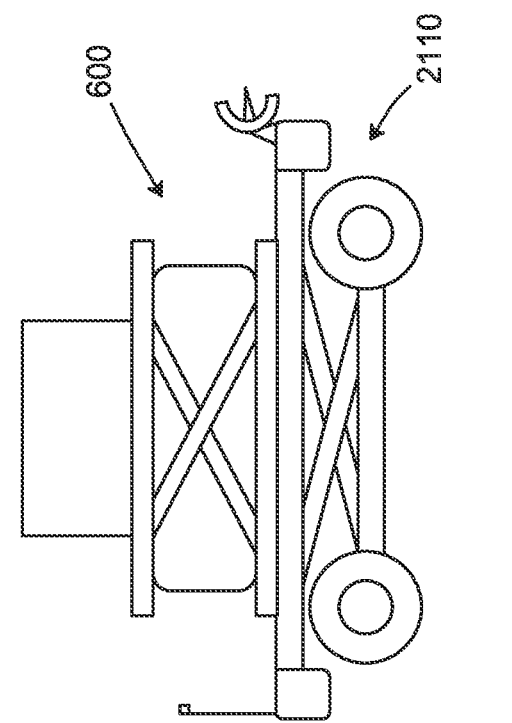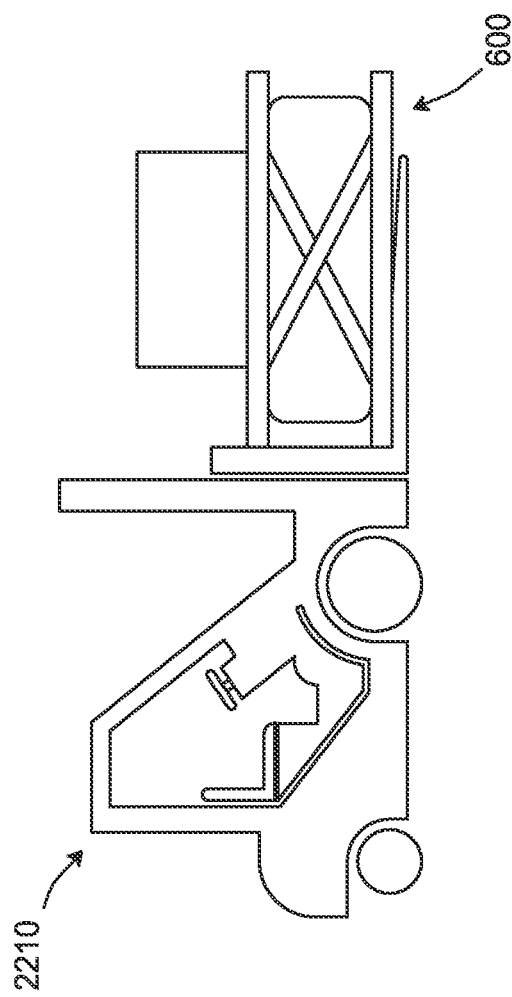
FIG. 22

MODULAR BI-LEVEL STORAGE AND TRANSPORT ASSEMBLY WITH COLLAPSIBLE FRAME (MTA)

TECHNICAL FIELD

This invention relates to a modular fluid-transport system which utilized a frame designed for transport on an aircraft and a replaceable fluid container or bladder which can be switched with a different fluid container or bladder according to the requirements for a particular fluid.

BACKGROUND

From the dawn of civilization and military warfare, it has been necessary to transport vital fluids and cargo from production sites to forward operating bases and combat areas. Over the past 6000+ years mankind has only changed the means of transport to today's methods using ground vehicles, boats, rail, and aircraft to disperse fuel, water, chemicals, fluids, and cargo to where they are required.

As each different fluid and cargo type requires unique materials for compatibility and provisions for safety and handling, and containment systems vary greatly. Transport and dispersal methodologies generate additional requirements unique to a mission. For example, ground transport requires ruggedness and protection, air transport low weight and a stabilized center of gravity, and water transport a combination of both with added materials compatibility challenges.

With advances in materials science, manufacturing techniques, and coatings coupled with various development programs within military agencies over the years, one might think that the solutions have converged on a single system that meets many needs, or at least a single core solution with expansions to address unique needs. However, if anything, while containers and auxiliary systems used today have tried to simplify transport and distribution, modern products have induced more variety, caused additional complexities, and still do not solve getting fluids and supplies delivered down to the last few feet of where they are needed. Concurrently, existing containment systems and delivery methods are manpower-intensive and certain classes of fluid, supplies, and equipment require extensive unpacking and setup time that the future battlespace will not easily permit. The ability to deliver turn-key, ready to use fluid, cargo, and supplies faster than an enemy can react in dispersed military operations, can be the deciding factor in battles and for the outcome of a war.

While minor changes are evident in current examples of modern battlefields, future highly dispersed operations, and new generations of modern weapons, along with existing and even some of the new technology logistics fluid and cargo containment systems, it is also clear that their handling, distribution, and true utility falls far short, and is relatively no different than WWII methods and technology. A containment system that works in all military domains and for dispersed operations; can be delivered by legacy, ground, sea, air and rail platforms; and is capable of being utilized by new generations of unmanned delivery systems is necessary to close the delivery gap to provide fluids and cargo down to the last few feet to a destination and will provide the military capability required in peer competitor warfare.

SUMMARY OF PARTICULAR EMBODIMENTS

The present disclosure presents a fluid transport system that is modular, structural, reconfigurable, and universal.

The apparatus of the present disclosure employs a modular bi-level storage and transport assembly (MTA) to transport fluids. An embodiment of the MTA comprises an upper and a lower rigid layer and an adjustable support mechanism coupled to the upper and lower rigid layers. The support mechanism may be designed in such a way that it may expand to increase a distance between the upper and lower rigid layers. In doing so, the MTA may be expanded, forming a space between the upper and lower rigid layers. The support mechanism may also be designed in such a way that it may contract to reduce the distance between the upper and lower rigid layers, collapsing the MTA.

In particular embodiments, the adjustable support mechanism comprises interlocking frame segments. In particular embodiments, the interlocking frame segments further include one or more locking components, which locking components may be placed at one or more intersections between two of the interlocking frame segments and the upper and lower rigid layers. In further embodiments, the one or more locking components are removable or adjustable mechanisms. In the same or other embodiments, the adjustable support mechanism has one end designed in such a way that it may slide along a defined mechanical path on either the upper or lower rigid layer. In further embodiments, there may be one or more receiving structures for a locking component placed at one or more positions along the mechanical path. In the same or other embodiments, the containment vessel may be a flexible bladder comprising a collapsible membrane wherein the membrane is designed such that it may automatically collapse to decrease a volume of the flexible bladder when contents are removed from the bladder, and the MTA may further comprise straps coupled to the collapsible vertical supports attached to the upper and lower rigid layers and a tightening mechanism attached to the straps that are designed to restrain the containment vessel between the upper and lower rigid layers as the MTA collapses.

In particular embodiments, the lower rigid layer may be configured to interface with a matching upper rigid lawyer of a matching MTA, allowing the matching MTA to securely mate with the MTA, providing stack ability. In the same or further embodiments, a shock absorber may be attached to either or both of the upper and lower rigid layers, where the shock absorber system may comprise at least one of: collapsible honeycomb cardboard blocks, air bags, open or closed cell foams, metallic or composite foils, reaction jets, pyrotechnic rockets, a vertical controlled descent and lift system, or a vertical descent arresting system.

In particular embodiments, the upper rigid layer is designed such that it allows storage of at least one of a rigid containment vessel, and Aircraft compatible pallet, or general cargo on top of the upper rigid layer. In the same or further embodiments, the lower rigid layer of the MTA may be designed such that it can be secured to an interior surface of at least one of an aircraft, a sea-based transport vehicle, or a ground-based transport vehicle. In the same or further embodiments, at least the upper or lower rigid layer is designed such as to secure to a sling, enabling sling loading via a vertical lift aircraft and/or other cargo transport and handling vehicles. In the same or further embodiments, at least one of the upper or lower rigid layers is designed to secure to parachute rigging for aircraft airdrop capability. In the same or further embodiments, the upper rigid layer is designed such that it may rotate or translate and further be locked in various positions by one or more locking mechanisms.

In particular embodiments, a containment vessel or cargo space is on top of the upper rigid layer when the upper rigid layer is in a vertical or horizontal position and the upper rigid layer is designed such that it may be set and locked in intermediate angular positions between a horizontal axis and a vertical axis, which axes are set in relation to the lower rigid layer.

In particular embodiments, there may further be a removable exterior hard or soft covering, where the removable exterior covering is attached to the upper or lower rigid layer via frames or existing features on the MTA. In particular embodiments, the removable exterior covering is waterproof and comprises removable material that is ballistic, non-ballistic, or fireproof. In particular embodiments, the removable exterior hard covering is further designed to articulate in various axes either manually or using electrical actuators, hydraulic actuators, and/or pneumatic actuators, where the actuators are controlled by at least an on-board device, a remote control device, or an autonomous control device.

In particular embodiments, the MTA is configured with at least an electrical actuator, a hydraulic actuator, and/or a pneumatic actuator for remote or autonomous operation. In particular embodiments, the upper and/or lower rigid layer are configurable with various military, commercial, and/or custom tie down fittings. In the same or further embodiments, the upper and/or lower rigid layer comprise aircraft compatible pallets. In the same or further embodiments, the upper and/or lower rigid layer is compatible with support mechanisms that allow at least lifting in a vertical plane or movement in a horizontal plane by various material handling devices and vehicles.

In particular embodiments, a collapsible containment vessel with internal baffles, such as may be stored in an MTA, may be designed to hold fluid, particulates, or slurries. In particular embodiments, the collapsible containment vessel comprises a collapsible membrane, a set of internal baffles, and straps. In particular embodiments, the baffles form a set of compartments with a plurality of openings to halt and direct the flow of the fluid, the particulates, or the slurries. In particular embodiments, each strap has a proximal end and a distal end, where the proximal end is coupled to the membrane and the distal end is configured to connect to a coupling point.

In particular embodiments, the straps are integrated into the membrane. In particular embodiments, one or more of the straps is further an extension of a baffle of the internal baffles. In particular embodiments, the collapsible containment vessel has one or more interface manifolds, where the interface manifolds are coupled to the membrane and configured to interface with at least one hose and/or at least one external port. In particular embodiments, the containment vessel has an edge on the lower perimeter of the lower membrane that is configured to interface with structural components of a rigid layer, a platform, and/or a pallet where the pallet is compatible with an air vehicle, a ground vehicle, and/or a sea vehicle.

In particular embodiments, the membrane is configured to self-seal after puncture and is made of a composite material, which material is configured to accommodate a specific composition of the fluids, the particulates, or the slurries. In particular embodiments, the containment vessel contains a chemical lining and/or material lining, where the lining is at least one of an inner and an outer surface of the membrane or a surface of the baffles. In particular embodiments, the straps may be arranged in a crossed pattern. In particular embodiments, the distal end of each strop is configured for coupling with a rigid layer, a platform, and/or a pallet, where the pallet is compatible with an air vehicle, a ground vehicle, and/or a sea vehicle. In particular embodiments, the distal end of one or more of the straps have manual or self-adjusting tensioners and are configured for connection with a coupling point of a cargo restraint system. In particular embodiments, the membrane or a portion of the membrane is removable and the membrane further comprises ballistic, non-ballistic, or fireproof material. In particular embodiments, the straps provide a load path for both the containment vessel and the fluids, particulates or slurries with the straps further retaining the containment vessel in position on or within a rigid layer, a platform, or a pallet. In particular embodiments, the membrane comprises a composite material layered in a way to allow the use of explosion proof foam.

The method of the present disclosure involves transporting a modular bi-level storage and transport assembly (MTA). In particular embodiments, the MTA comprises a dolly, a carrier, or a chassis. In particular embodiments, the method involves activating a location transponder that is incorporated into the MTA. The method may further involve a first transport mechanism receiving location information from the transponder. The method may further involve determining that the location transponder is broadcasting a pickup request signal and transmitting a location and orientation of the MTA to the first transport mechanism. In particular embodiments, the method involves causing the first transport mechanism to travel to the location of the MTA, securely connecting the MTA to the first transport mechanism based on the orientation of the MTA, and transporting the MTA to a specified destination.

In particular embodiments, the MTA interfaces to the dolly, the carrier, or the chassis via a coupling and loading mechanism utilizing integrated connection points of the dolly, the carrier, or the chassis. In particular embodiments, securely connecting the first transport mechanism to a second transport mechanism involves orienting the first transport mechanism to align an aft connection interface of the first transport mechanism with a forward connection interface of the second transport mechanism and engaging the forward connection interface of the second transport mechanism to securely connect to the aft connection interface of the first transport mechanism. In particular embodiments, the first transport mechanism raises the MTA via interfaces to the dolly, the carrier, or the chassis off a surface of a resting area.

In particular embodiments, securely connecting the MTA to the first transport mechanism includes lifting the MTA using arms connected to the first transport mechanism and securely locking the MTA into a new position, the new position being elevated from an initial position.

BRIEF DESCRIPTION OF THE DRAWINGS

FIG. 7A depicts a basic rotating platform containment system design with standard attachment points in a vertical position.

FIG. 7B depicts a basic rotating platform containment system design with standard attachment points in a horizontal position.

FIG. 7C depicts three basic rotating platform containment systems stacked on top of each other.

FIG. 22 depicts a legacy transport mechanism carrying a modular bi-level storage and transport assembly (MTA).

DESCRIPTION OF EXAMPLE EMBODIMENTS

Apparatus

Figure 1A:
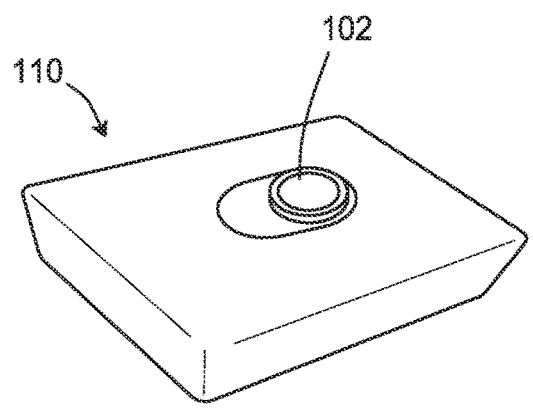
FIG. 1A depicts an embodiment of a fluid-specific replaceable bladder.
Figure 1B:
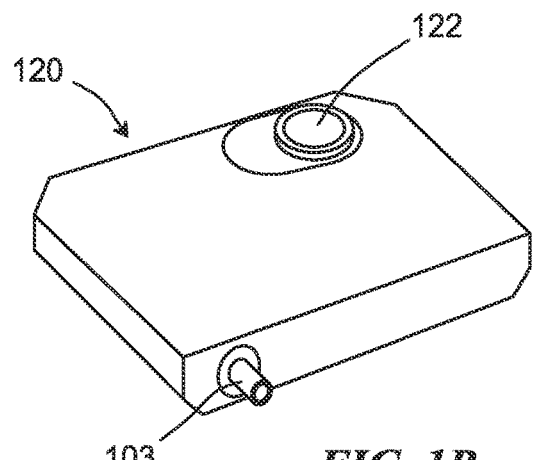
FIG. 1B depicts an embodiment of a fluid-specific replaceable bladder.
Figure 1C:
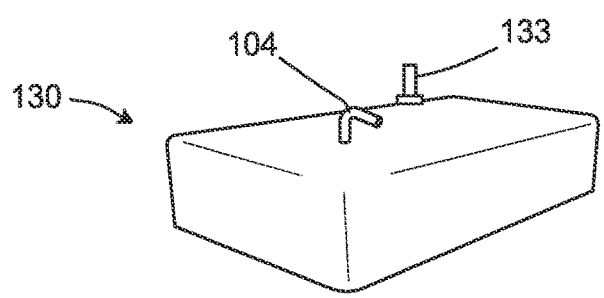
FIG. 1C depicts an embodiment of a fluid-specific replaceable bladder.

FIGS. 1A-1C depict examples of containment vessels, e.g., fluid-specific replaceable bladders, which may be held in a modular bi-level storage and transport assembly with collapsible frame (MTA). As an example and not by way of limitation, FIG. 1A depicts an embodiment of a fluid-specific replaceable bladder 110 with an opening 102. As an example and not by way limitation, FIG. 1B depicts another embodiment of a fluid-specific replaceable bladder 120 with an opening 122 and an interface manifold 103. FIG. 1C depicts yet another embodiment of a fluid-specific replaceable bladder 130 with one interface manifold 133 on one side and another interface manifold 104 on another side. As an example and not by way of limitation, a replaceable bladder may have a collapsible membrane as an outer shell (soft or hard). Fluid-specific replaceable bladders may have different materials and/or properties chosen to meet the needs of particular fluids, slurries, or particulates which are stored within them. As an example and not by way of limitation, the replaceable bladders may have one or more interface manifolds, which interface manifolds may be coupled to the collapsible membrane. The interface manifolds may provide an interface between the replaceable bladder and one or more of a variety of inputs or outputs. As an example and not by way of limitation, the interface may be with accessory equipment to the vehicle, including but not limited to: on-vehicle fuel access ports, spray systems, dispersion systems, air and ground refueling systems, etc. Additionally or alternatively, as an example and not by way of limitation, the replaceable bladder may have a lower edge on a lower perimeter of the membrane. This lower edge may aid in mating with a surface to prevent movement of the bladder during transport. Specifically, the lower edge may be configured to interface with structural components of another surface, i.e., a rigid layer, a platform, and/or a pallet, which pallet may be compatible with a vehicle, e.g., an air vehicle, a ground vehicle, and/or a sea vehicle.

As an example and not by way of limitation, a membrane may be made of a composite material, which material is selected or designed to accommodate a specific composition of fluids, particulates, or slurries. As an example and not by way of limitation, a membrane material may be a polymer, where the polymer is a soft, semi-rigid or rigid fluid container and may be a composite, an aramid, and/or an exotic combination. Additionally or alternatively, the membrane may be designed such that it may self-seal after puncture. Additionally or alternatively, in particular embodiments, the membrane may be include a chemical lining or a material lining along an outer surface, an inner surface, and/or a surface of a set of baffles on the interior of the membrane. Additionally or alternatively, in particular embodiments, all or part of the membrane may be made of ballistic, non-ballistic, and/or fireproof material. Furthermore, in particular embodiments, the membrane or a portion of the membrane may be removeable. Additionally or alternatively, in particular embodiments, the membrane may be made of a composite material which is layers in a way as to allow the user of explosion-proof foam.

As an example and not by way of limitation, a replaceable bladder may include a plurality of straps, with each strap having a proximal and a distal end, where the proximal end is coupled to a membrane of the replaceable bladder and the distal end is designed to connect to a coupling point apart from the membrane to allow the bladder to be secured to some other surface. As an example and not by way of limitation, in particular embodiments, one or more of the plurality of straps may be integrated into the membrane itself through infusion or similar means. In the same or other embodiments, one or more of the plurality of straps may be an extension of one or more baffles in the set of internal baffles. The integration and/or extension may serve to distribute the load caused by movement of the fluid, slurries, or particulates more evenly. As an example and not by way of limitation, in particular embodiments, the plurality of straps may provide a load path for both the replaceable bladder and the fluids, the particulates, or the slurries, and/or the plurality of straps may further retain the replaceable bladder in a set position on or within a rigid layer, a platform, and/or a pallet.

As an example and not by way of limitation, the plurality of polymer straps may be arranged in a crossed pattern or other configuration for the particular type of fluids, slurries, or particulates to be transported. In the same or other embodiments, the distal end of each strap of the plurality of straps may be designed such that each may be coupled to a rigid layer, a platform and/or a pallet, where the pallet is compatible with a vehicle, e.g., an air vehicle, a ground vehicle, and/or a sea vehicle. As an example and not by way of limitation, the distal end of one or more straps of the plurality of straps may include manual or self-adjusting tensioners and be configured to connect with a coupling point of a cargo restraint system. As an example and not by way of limitations, in particular embodiments, the distal end of one or more straps secures to tie down fittings, e.g., military, commercial, and/or custom tie down fittings.

As an example and not by way of limitation, in particular embodiments, a collapsible membrane may be configured to mate with a receiving surface of a transport platform of a vehicle, e.g., an air vehicle, a ground vehicle, and/or a sea vehicle. As an example and not by way of limitation, the transport platform of the vehicle may be a rigid structure or cargo pallet, and a lower perimeter of the collapsible membrane is designed such that it can mate with structural components of the rigid structure or cargo pallet, which rigid structure or cargo pallet is designed to be securely attached to an inboard-facing surface of the vehicle and/or an outboard-facing surface of the vehicle. Use of a pallet, either for an upper and/or lower layer or a transport platform of a vehicle, may, for example, provide easy logistics for ground handling using aircraft pallet dollies, forklifts, under-aircraft sling transport, and internal aircraft transport with interfaces for various cargo handling systems utilizing rails, locks, and rollers. Such a base also provisions for future development of combat offload and air-drop delivery systems. Use of a pallet for an upper layer, additionally, adds structure that creates extra storage volume that would previously results in empty space. This space can be filled with cargo.

As an example and not by way of limitation, an outer membrane of a fluid bladder may be either a flexible and collapsible outer shell, a semi-rigid shell, or a rigid outer shell. Whether to use a flexible, semi-rigid, or rigid outer shell will depend on the material being transported.

Figure 2A:
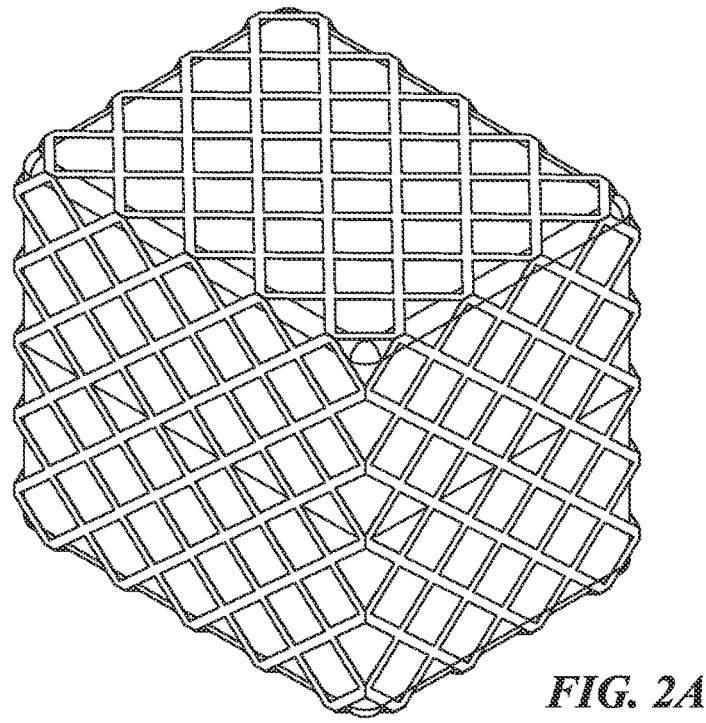
FIG. 2A depicts a perspective view of an embodiment of a replaceable bladder.
Figure 2B:
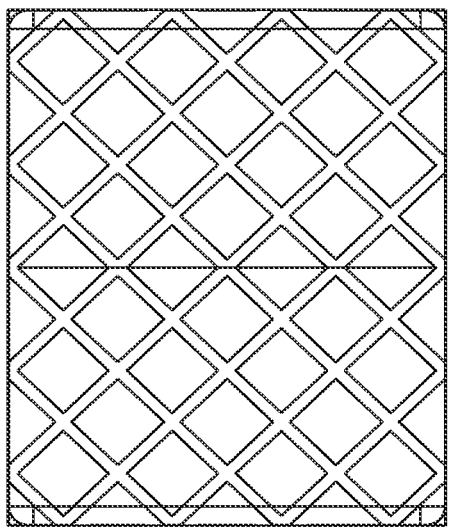
FIG. 2B depicts a side view of an embodiment of a replaceable bladder.
Figure 2C:
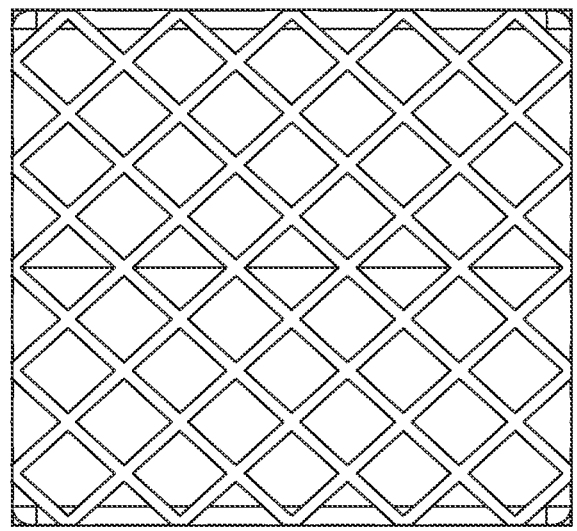
FIG. 2C depicts a different side view of an embodiment of a replaceable bladder.

FIGS. 2A-2C depict different views of an embodiment of a basic structure of an outside of a replaceable bladder 101. Specifically, FIG. 2A depicts a perspective view, and FIGS. 2B and 2C depict different side views, of an embodiment of a replaceable bladder.

Figure 3A:
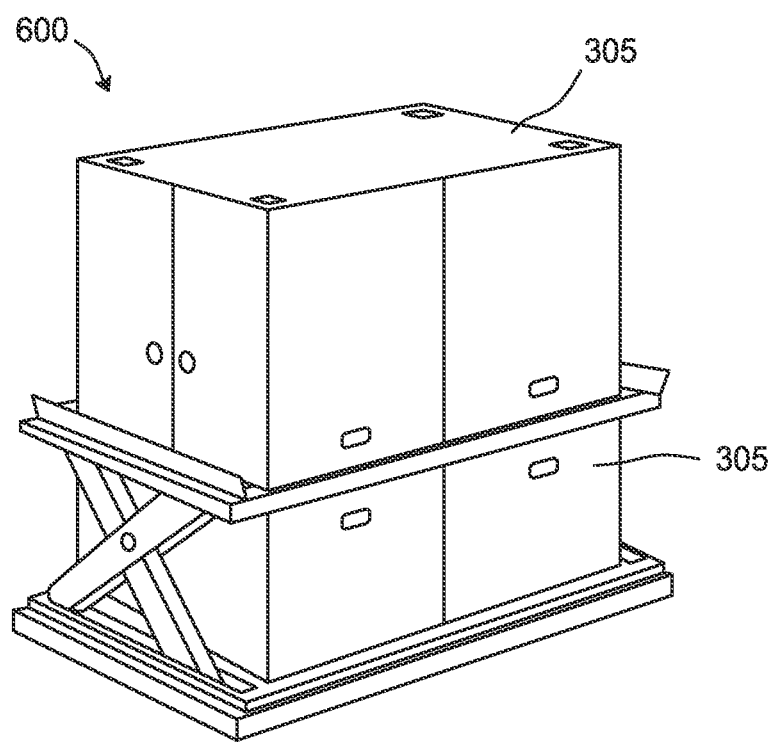
FIG. 3A depicts hard coverings surrounding a replaceable bladder.
Figure 3B:
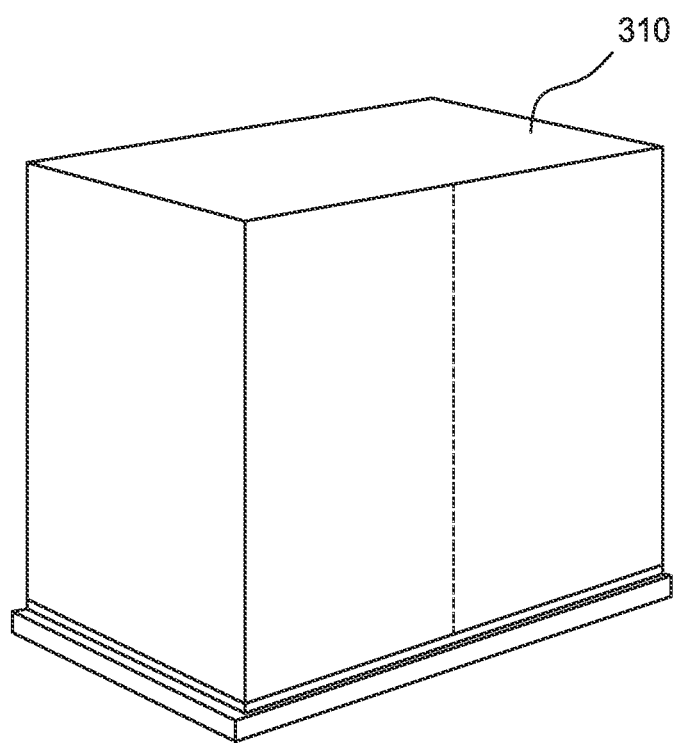
FIG. 3B depicts flexible coverings surrounding a replaceable bladder.

As an example and not by way of limitation, in particular embodiments, an MTA may include a removable exterior covering, which may be a removeable exterior hard covering and/or a removable exterior soft covering. FIG. 3A depicts hard coverings surrounding two replaceable bladders. As an example and not by way of limitation, as illustrated in the FIG. 3A, a replaceable bladder with a hard covering 305 may be within an MTA 600 and another replaceable bladder with a hard covering 305 may be placed on top of the MTA 600. Similarly, FIG. 3B depicts flexible coverings surrounding a replaceable bladder. As an example and not by way of limitation, as illustrated in FIG. 3B, a replaceable bladder may be covered with a flexible covering 310. The removable exterior covering may be attached to an upper rigid layer 601 and/or a lower rigid layer 604 via frames and/or existing features of the MTA. As an example and not by way of limitation, in particular embodiments, the removable exterior covering is waterproof and/or has removable material that is ballistic, non-ballistic, and/or fireproof. Additionally or alternatively, the removable exterior covering is designed such that it can articulate in various axes manually and/or actuators, e.g., electrical actuators, hydraulic actuators, or pneumatic actuators. In the case where articulation is done using actuators, the actuators may be controlled by an on-board device, a remote control device, and/or an autonomous control device. In particular embodiments, the on-board control device includes a suitable power module. In particular embodiments, remote and autonomous control devices would rely on radio frequency, ambient light, aimed light sources, Laser transceivers, or atmospheric sensors, which would talk to the on-board device. As an example and not by way of limitation, in particular embodiments, the MTA is configured with an electrical actuator, a hydraulic actuator, and/or a pneumatic actuator for remote or autonomous operation.

Figure 4:
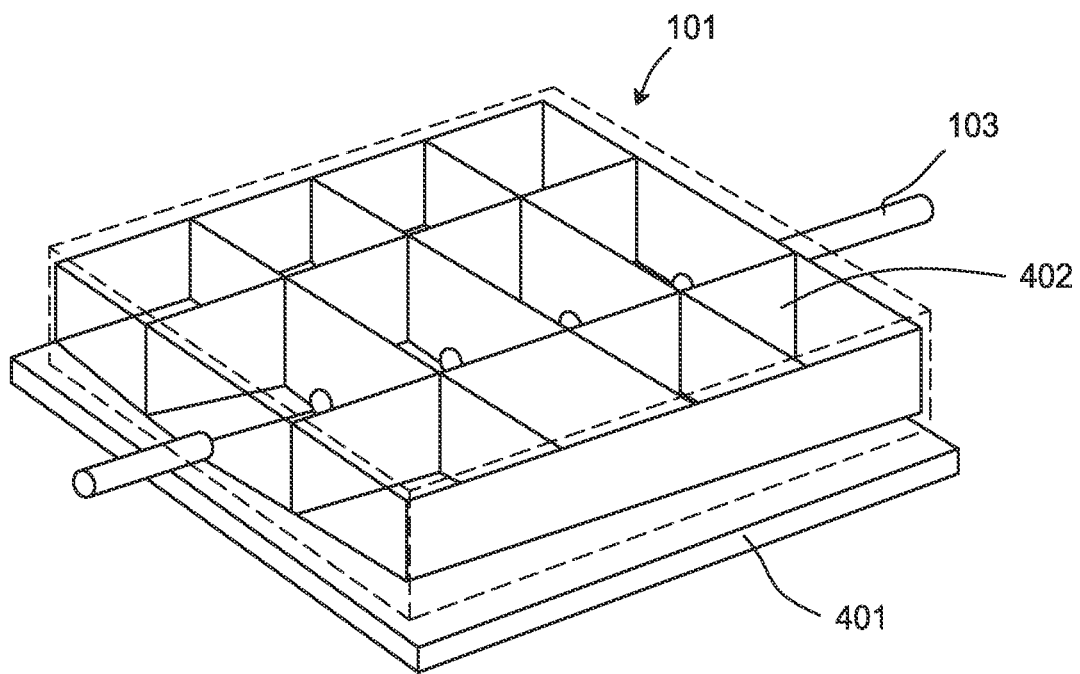
FIG. 4 depicts an interior of a replaceable bladder.

FIG. 4 depicts an interior of a replaceable bladder 101. As an example and not by way of limitation, the interior may comprise baffles 402, which baffles form a set of compartments configured to halt and direct the flow of a fluid, particulates, or slurries in the container. The baffles 402 help prevent sudden shifts in fluid (or other material) during operations of air, land, or sea vehicles, which is particularly important when the volume of the fluid is low enough for there to be empty space to fill within the bladder. Such sudden movements are undesirable since they cause sudden changes in the center of gravity of the bladders, which can cause changes to the center of gravity of the vehicle itself. The size and shape of compartments may vary according to the fluid, particulates, or slurries in the replaceable bladder. In an embodiment, the replaceable bladder 101 may be located on a lower surface 401. In an embodiment, the replaceable bladder 101 includes a connection to an interface manifold 103. As an example and not by way of limitation, two interface manifolds 103 may be located on either end of the replaceable bladder 101, one being an input manifold and the other being an output manifold.

In particular embodiments, the baffles have openings, which may be of various shapes, sizes, and numbers-depending on the fluid, particulate, or slurries-to assist in the subtle shifting of weight during movement and dispersal. These openings may, e.g., be small holes in the walls of the baffles.

Figure 5A:
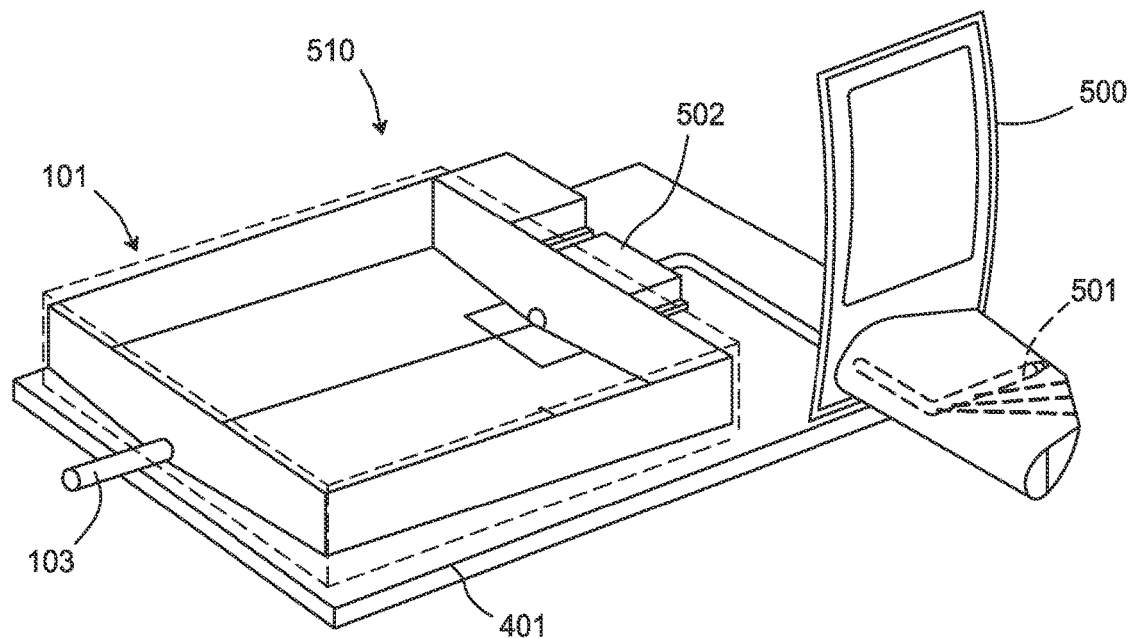
FIG. 5A depicts an aerial dispersal system utilizing a collapsible containment vessel with internal baffles (CCViB) and MTA assemblies.
Figure 5B:
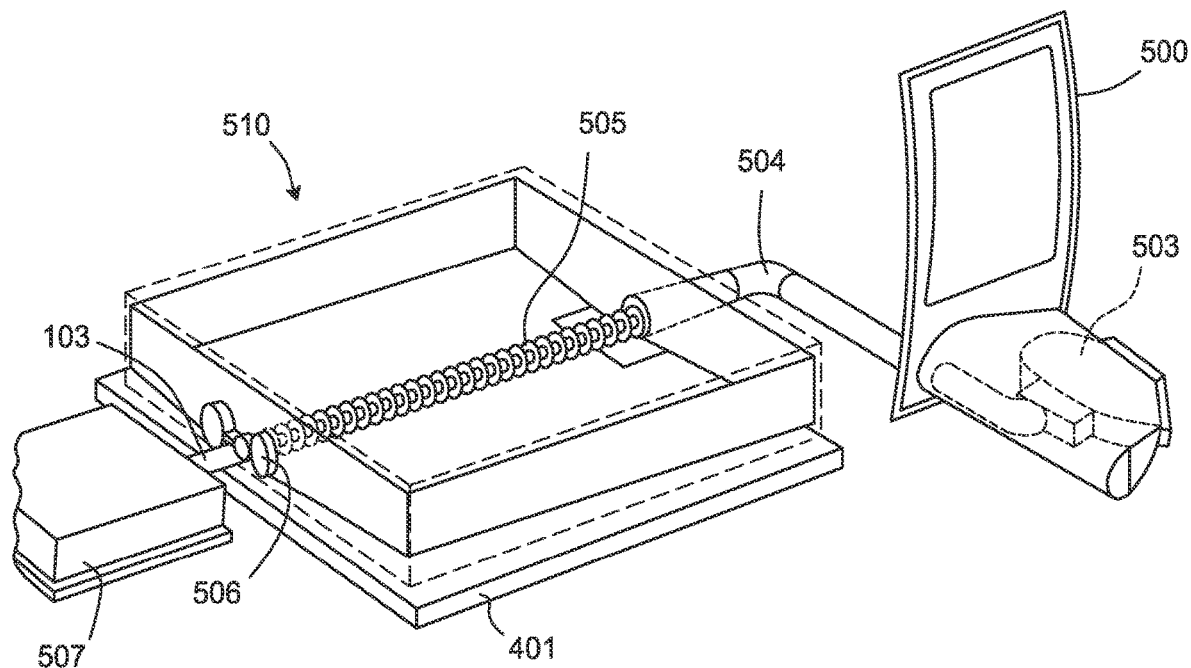
FIG. 5B depicts more details for an embodiment of an aerial dispersal system involving dry-goods dispersal utilizing the CCViB and MTA assemblies.
Figure 5C:
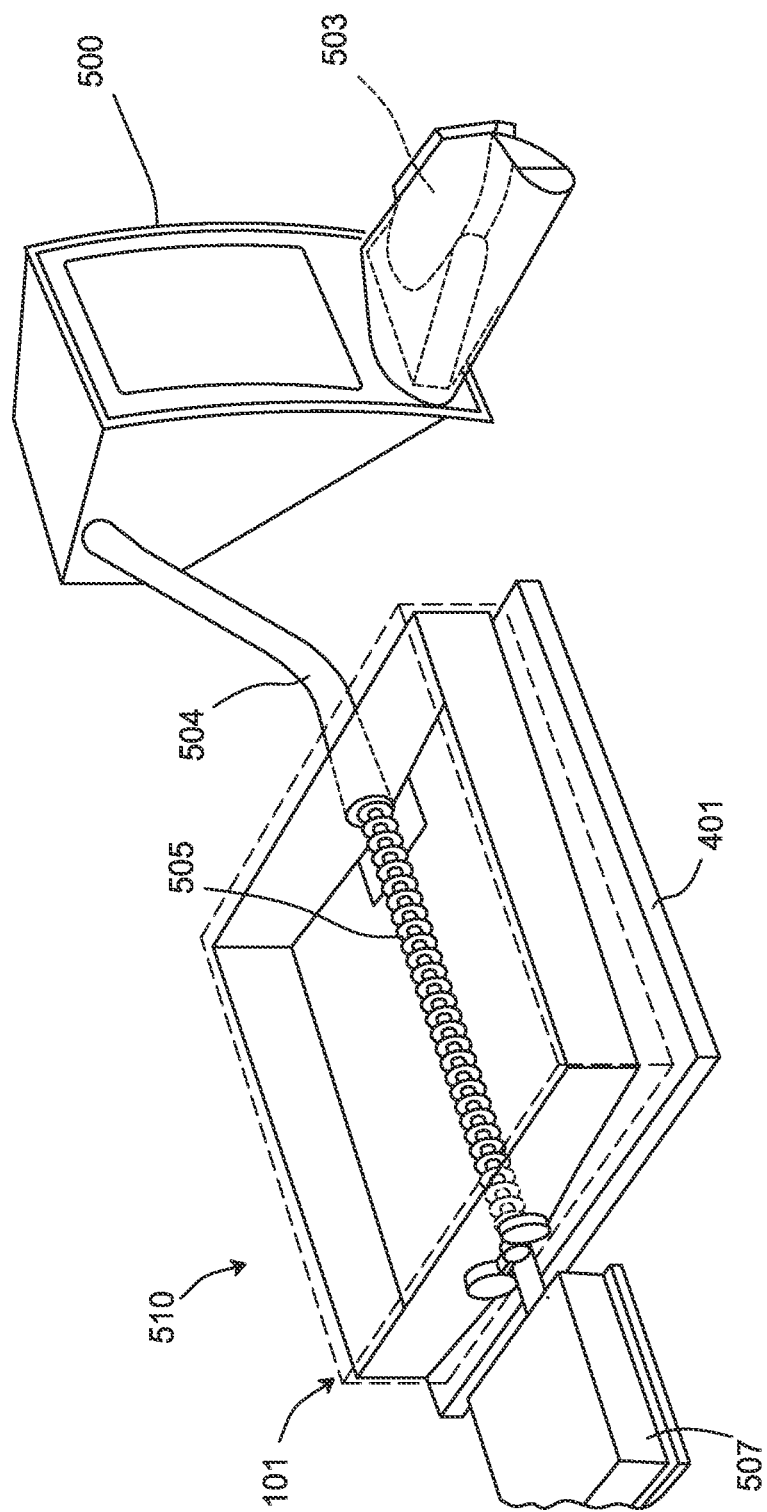
FIG. 5C depicts more details for an embodiment of an aerial dispersal system involving dry-goods dispersal with a hopper utilizing the CCViB and MTA assemblies.
Figure 6A:
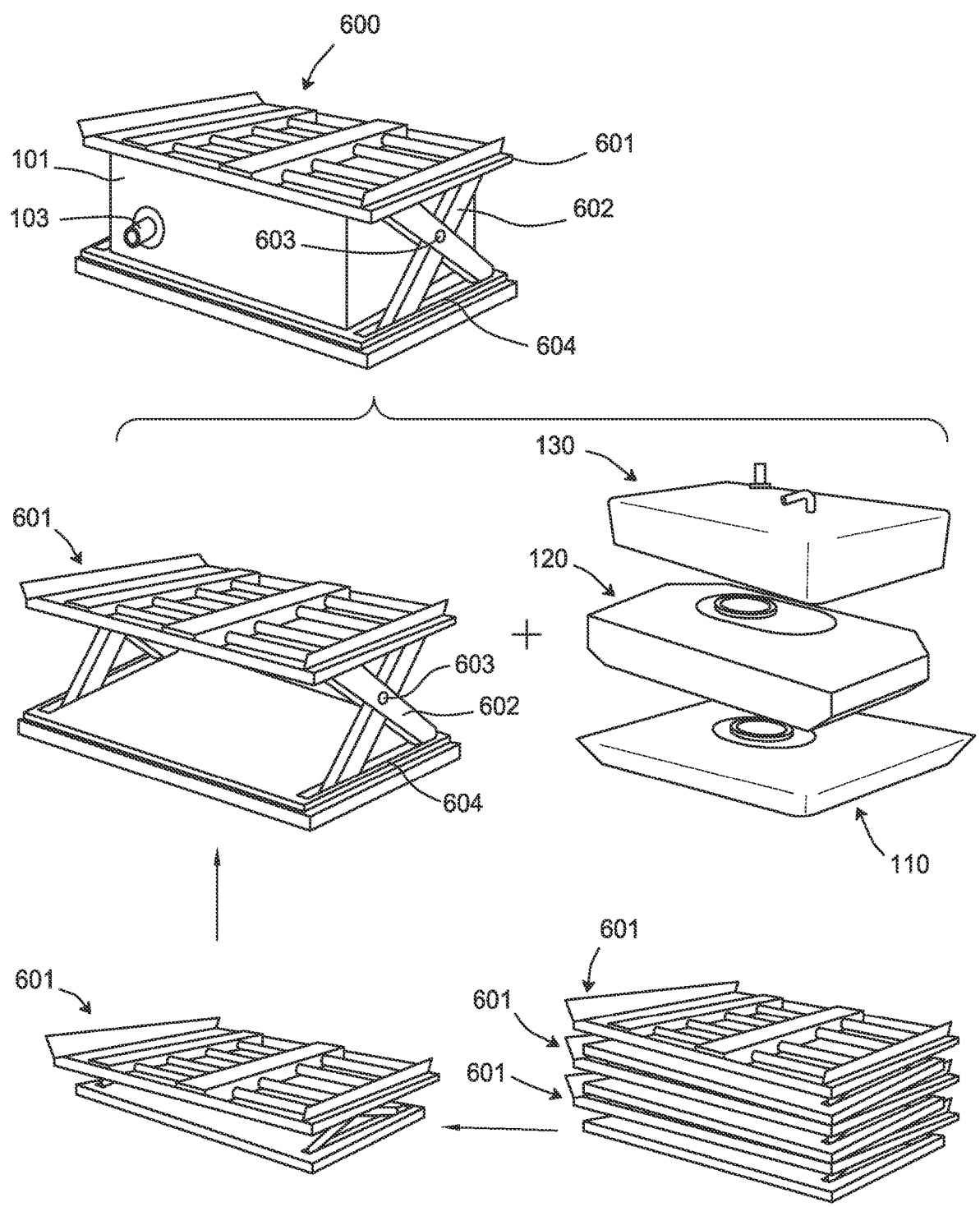
FIG. 6A depicts components of the combined CCViB and MTA combined modular configuration in various stages of assembly.
Figure 6B:
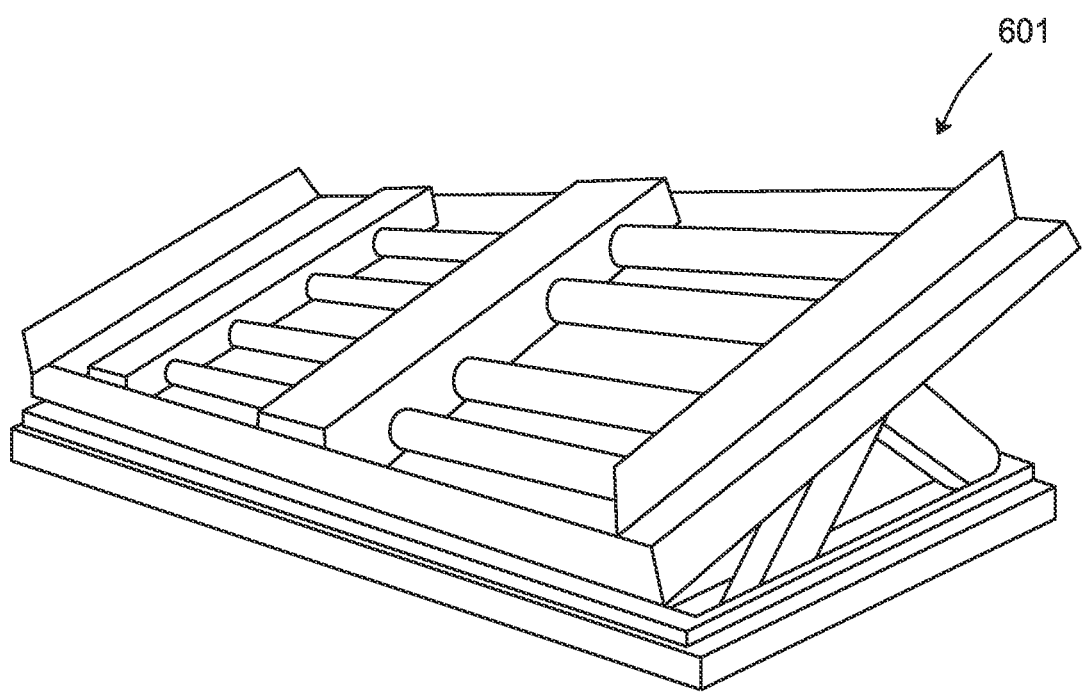
FIG. 6B depicts an MTA with left side tilt feature.
Figure 6C:
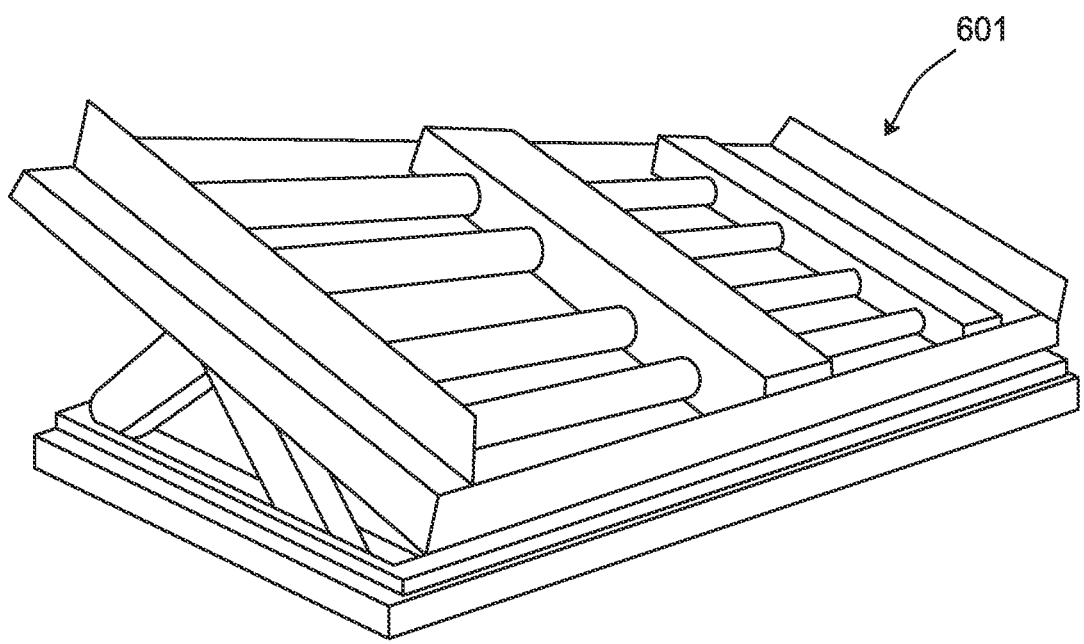
FIG. 6C depicts an MTA with right side tilt feature.

FIGS. 5A-5C depict an aerial dispersal system utilizing CCViB and MTA assemblies. FIG. 5A depicts a basic structure of an aerial dispersal system 510, including a replaceable bladder 101 with an interface manifold 103, e.g., an input interface manifold. The aerial dispersal system may refer to dispersal of fluids, slurries, and/or particulates from a containment vessel or removable bladder. In this context, fluids, slurries, and/or particulates can include, but are not limited to, micro sensors, fire retardant devices, sensors that can blanket an area, seedlings, water bombs/balls for fires, and/or any other piece of cargo that can be dispersed, all of which are dispersible because they can behave in a fluid-like way even if it is a solid. Essentially, it creates dynamics that act in a fluidized way for dispersal from the replaceable bladder 101. As an example and not by way of limitation, the aerial dispersal system further comprises a fluid pump 302 and a deployment aperture 501 through a door 500 of an aircraft. FIG. 5B depicts more details for an embodiment of an aerial dispersal system 510 involving dry-goods dispersal. As an example and not by way of limitation, a drive unit 507, an interface manifold 103, e.g., an input interface manifold, an auger 505, and a tube 504 outputting the particulates. As an example and not by way of limitation, the aerial dispersal system 510 further comprises a particulate dispenser 503 through door 500 of an aircraft. FIG. 5C depicts more details for an embodiment of an aerial dispersal system 510 involving particulate dispersal with a hopper. As an example and not by way of limitation, a drive unit 507, an interface mechanism 506, an auger 505, and a tube 504 may be used for outputting particulates. As an example and not by way of limitation, the aerial dispersal system 510 further comprises a particulate dispenser 503 through door 500 of an aircraft.

FIGS. 6A-6C depict components of the combined CCVib and MTA modular configuration in various stages of assembly and position. FIG. 6A depicts components of the combined CCVib and MTA module configuration in various stages of assembly. As an example and not by way of limitation, the module configuration may comprise a modular bi-level storage and transport assembly with collapsible frame (MTA) 600. The MTA 600 may comprise an upper rigid layer 601 and a lower rigid layer 604 with an adjustable support mechanism 602 coupled to the upper rigid layer 601 and the lower rigid layer 604. In particular embodiments, the support mechanism 602 may be arranged such that it can expand to increase a distance between the upper rigid layer 601 and the lower rigid layer 604, thus expanding the MTA and forming a space between the upper rigid layer 601 and the lower rigid layer 604. In particular embodiments, a containment vessel, e.g., a fluid bladder, may be placed in the space formed between the upper rigid layer 601 and the lower rigid layer 604. In particular embodiments, the support mechanism 602 may further be able to contract to reduce the distance between the upper rigid layer 601 and the lower rigid layer 604, thus collapsing the MTA. This may be done, for example, when fluid, slurries, or particulates are emptied out of the containment vessel. In particular embodiments, the adjustable support mechanism 602 is made up of a plurality of interlocking frame segments.

As an example and not by way of limitation, a one or more locking components 602, e.g., a pin, may be located at one or more intersections of the support mechanism 602, where the intersection is between two of the plurality of interlocking frame segments and the upper rigid layer 601 and the lower rigid layer 604. As an example and not by way of limitation, the one or more locking components may be removable or adjustable mechanisms. As an example and not by way of limitation, the adjustable support mechanism 602 may be designed such that it may slide along a defined mechanical path on either the upper rigid layer 601 or the lower rigid layer 604. Additionally, in particular embodiments, one or more receiving structures for a locking component may be placed at one or more positions along the mechanical path such that the support mechanism 602 may be locked at various positions as the MTA 600 expands or retracts, creating stability for the contents of the containment vessel.

As depicted in FIG. 6A, in particular embodiments, one of various fluid-specific replaceable bladders 101, 110, 120, or 130 is placed between the upper rigid layer 601 and the lower rigid layer 604. Furthermore, in particular embodiments, the MTA 600 may be collapsed and stacked with other MTAs. As depicted in FIG. 6A, the process of assembly may involve removing one MTA 600 from a stack of MTAs, expanding the MTA 600 and placing a fluid-specific replaceable bladder 101 in between the upper rigid layer 601 and the lower rigid layer 604 of the MTA 600. As an example and not by way of limitation, the replaceable bladder 101, or flexible bladder, has a flexible collapsible membrane designed to automatically collapse to decrease the volume of the bladder 101 when contents are removed from the bladder 101. As an example and not by way of limitation, to aid in the automatic collapsing of the bladder, the MTA may have straps coupled to collapsible vertical supports which are attached to the upper rigid layer 601 and the lower rigid layer 604 and/or a tightening mechanism attached to the straps which allows the straps to tighten (automatically or manually) as the MTA collapses, thereby restraining the bladder 101 between the upper rigid layer 601 and the lower rigid layer 604. As an example and not by way of limitation, in particular embodiments, straps may be coupled to the upper rigid layer 601 and the lower rigid layer 604 and/or a tightening mechanism may be attached to the plurality of straps which is designed to restrain the bladder 101 between the upper rigid layer 601 and the lower rigid layer 604 as the MTA collapses. FIG. 6B depicts an MTA 600, also known as a basic horizontal platform containment system design, with left side tilt feature. FIG. 6C depicts an MTA 600, also known as a basic horizontal platform containment system design, with right side tilt feature.

As an example and not by way of limitation, in particular embodiments, the lower rigid layer 604 is designed such that it may interface with a matching upper rigid layer 601 of a matching MTA. This allows the matching MTA to securely mate with the MTA, allowing for stacking of MTAs on top of one another which aids in safe and simple storage of both full and empty MTAs during flight. Similarly, in particular embodiments, the upper rigid layer 601 may be designed to allow storage of a rigid containment vessel, and Aircraft compatible pallet, and/or general cargo on top of the upper rigid layer 601, thus increasing the ability to store and transport items while decreasing the amount of cargo space that is occupied by the items.

As an example and not by way of limitation, in particular embodiments, the lower rigid layer 604 is designed such that it can secure to an interior surface of a vehicle, e.g., an aircraft, a sea-based transport vehicle, and/or a ground-based vehicle. Alternatively or additionally, the upper rigid layer 601 and/or the lower rigid layer 604 may be designed to secure a sling to enable sling loading via a vertical lift aircraft and/or other cargo and transport handling vehicles. As an example and not by way of limitation, the aircraft securing methods may be 463L pallet type connection, tie down fittings, or both. The tie down fittings may be common military and commercial tie down fittings.

As an example and not by way of limitation, in particular embodiments, particularly where an MTA will be airdropped, a shock absorber system may be attached to the lower rigid layer 604 and/or the upper rigid layer 601. As an example and not by limitation, the shock absorber system may be made up of one or more of: collapsible honeycomb cardboard blocks, airbags, open or closed cell foams, metallic or composite foils, reaction jets, pyrotechnic rockets, a vertical controlled descent and lift system, or a vertical descent arresting system. Similarly, in particular embodiments, the upper rigid layer 601 and/or the lower rigid layer 604 may be designed such that parachute rigging may be attached to the MTA to allow for airdrop from an aircraft.

FIGS. 7A-10C depict various embodiments of an MTA, specifically illustrating different rigid layers. In any of these embodiments, an upper rigid layer may be designed such that it can be rotated and/or translated to increase utility for certain mission operations. In any of these embodiments, the MTA is designed to be customizable, allowing elements to be changed around to accommodate different mission operations. The upper rigid layer may further be locked in various positions by one or more locking mechanisms. Furthermore, the MTA may be designed such that, when the upper rigid layer is in a vertical or horizontal position, a containment vessel or cargo space may be on top of the upper rigid layer. In particular embodiments, the upper rigid layer may also be designed to be set and locked in intermediate angular positions between a horizontal axis and a vertical axis, where the axes are set in relation to a lower rigid layer. All figures represent means to attach specialized devices, supplies, and equipment.

FIGS. 7A-7C depicts an embodiment of an MTA 700, specifically a basic rotating platform containment system, with standard attachment points. FIG. 7A depicts a basic rotating platform containment system design 700 with standard attachment points for an upper rigid layer 710 in a rotated vertical position. As an example and not by way of limitation, the upper rigid layer 710 may have a pegboard or a similar design. This may allow a crew to have quick and easy access to items. This may be used like a tool shelf. As an example and not by way of limitation, such a design may allow a crew to quickly bring in items, tools, and/or IT systems. Such a design may reduce the number of boxes full of items that would otherwise be brought on an aircraft. Since packaging itself creates wasted airspace on a vehicle, such a design would save a significant amount of space. FIG. 7B depicts a basic rotating platform containment system design 700 with standard attachment points for an upper rigid layer 710 in a rotated horizontal position. FIG. 7C depicts three basic rotating platform containment systems 700 collapsed and stacked on top of each other for storage and transport.

Figure 8A:
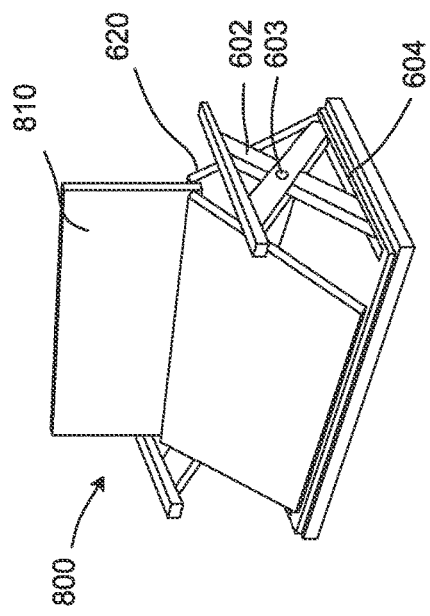
FIG. 8A depicts one embodiment of a basic rotating platform system with modular panels in a vertical position.
Figure 8B:
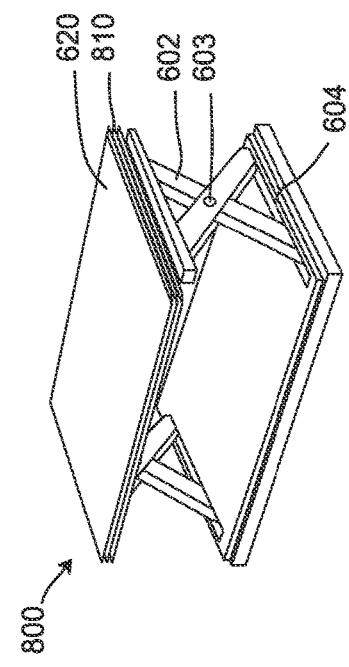
FIG. 8B depicts another embodiment of a basic rotating platform system with modular panels in a vertical and angular position.
Figure 8C:
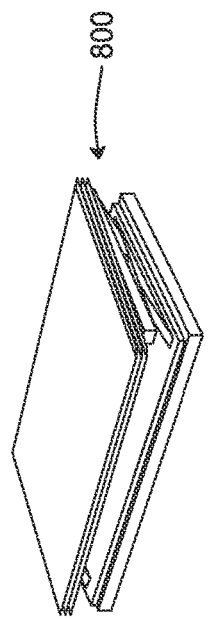
FIG. 8C depicts a basic rotating platform system design with modular panels in a stacked vertical position.
Figure 8D:
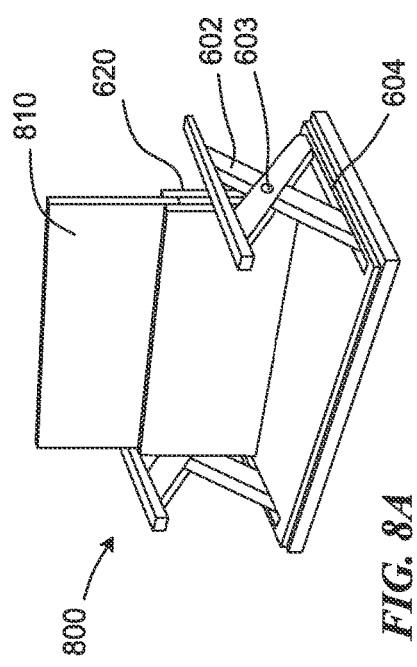
FIG. 8D depicts a basic rotating platform system design with modular panels stacked and rotated horizontal.
Figure 8E:
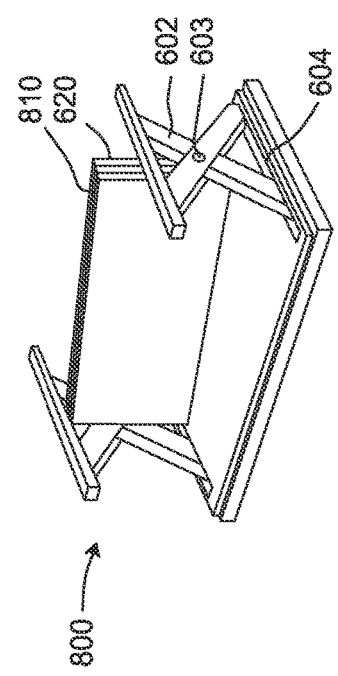
FIG. 8E depicts a basic rotating platform system arranged so it may be stacked.

FIGS. 8A-8E depict an embodiment of an MTA 800, specifically a basic rotating vertical platform system with modular panels. FIG. 8A depicts one embodiment of a basic rotating vertical platform system 800 with modular panels 810, 820 in an up position. FIG. 8B depicts another embodiment of a basic rotating platform system 800 with modular panels 810, 820 in an angular and vertical position. FIG. 8C depicts a basic rotating platform system design 800 with modular panels 810, 820 folded vertically and lowered to a common height. FIG. 8D depicts a basic rotating vertical platform system design 800 with modular panels 810 and 820 rotated horizontally. FIG. 8E depicts a basic rotating platform system 800 collapsed so that it may be stored and/or stacked with other MTAs. The basic rotating platform system 800 may include panels which may be sandwiched together, allowing for multiple layers. As an example and not by way of limitation, this may allow for scalable ballistics protection and/or solar panels. Additionally or alternatively, three modular panels 810 and 820, may be stacked for triple ballistics protection. As an example and not by way of limitation, in some embodiments, the modular panels 810 and 820 may be reconfigured with IT equipment such as LCD screens.

Figure 9A:
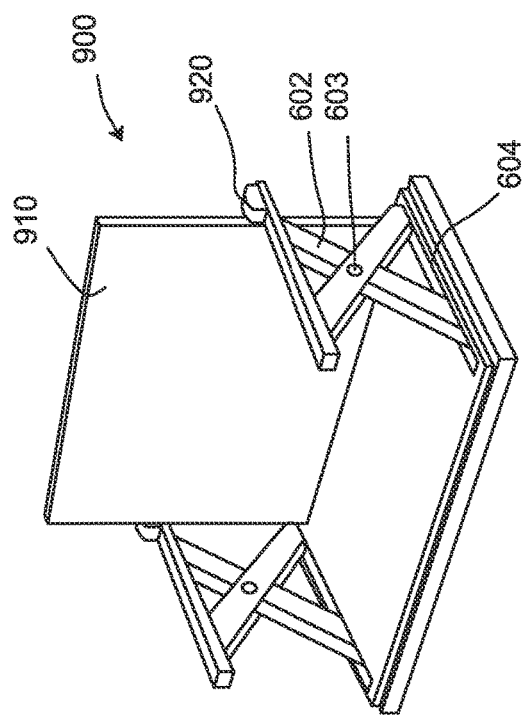
FIG. 9A depicts a basic rotating platform system with side slide panels in a fully vertical position.
Figure 9B:
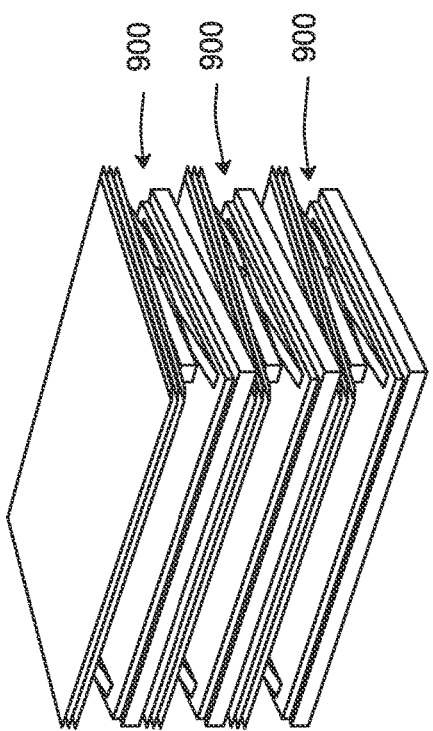
FIG. 9B depicts a basic rotating platform system with side slide panels in a fully vertical position.
Figure 9C:
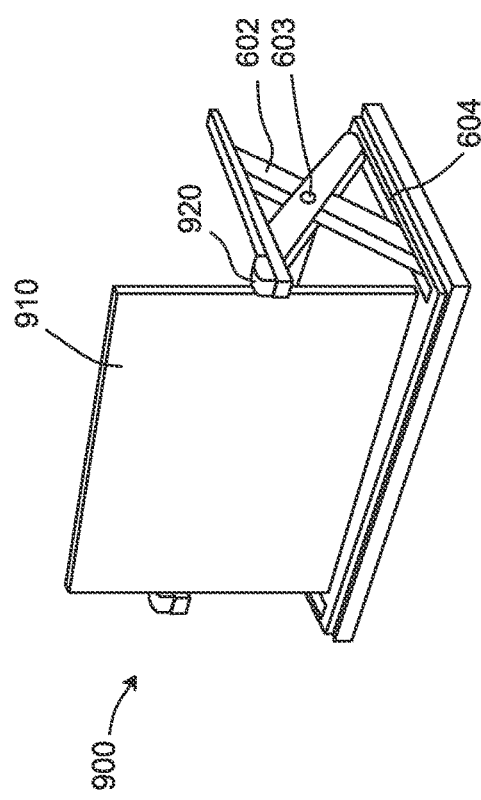
FIG. 9C depicts a basic rotating platform system with side slide panels in a horizontal position.
Figure 9D:
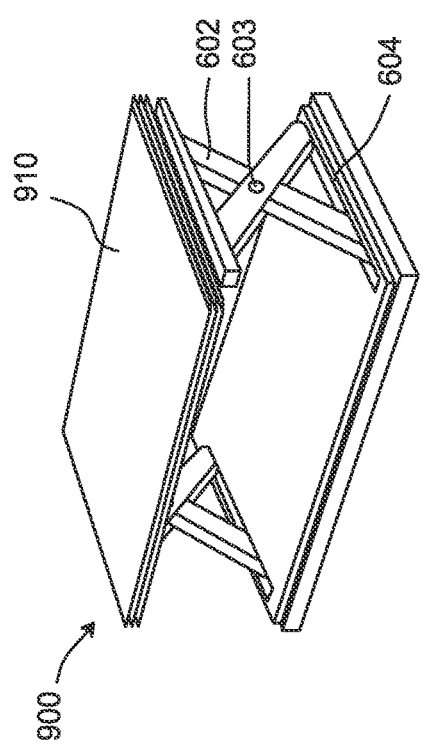
FIG. 9D depicts a basic rotating platform system with side slide panels configured so it may be stacked.

FIGS. 9A-9D depict an MTA, specifically a basic rotating platform system with side slide panels 900. FIG. 9A depicts a basic rotating platform system 900 with side slide panels 910 in a vertical position. In particular embodiments, a slider 920 may be used to move the side slide panels 910 from one part of the support structure 602 to the other. FIG. 9B depicts a basic rotating vertical platform system 900 with side slide panels 910 in a vertical position. As an example and not by way of limitation, side slide panels 910 may be used as protective panels. FIG. 9C depicts a basic rotating platform system 900 with side slide panels 910 in a horizontally rotated position, such that a fluid bladder 101, or equipment and supplies may be placed below the side slide panels 910, and the MTA base 604. FIG. 9D depicts three basic rotating platform systems 900 rotated horizontally and collapsed with side slide panels stacked on top of each other.

Figure 10B:
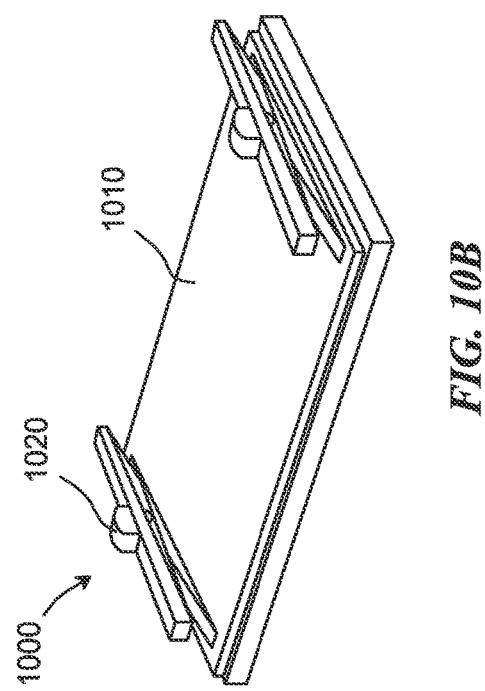
FIG. 10B depicts a basic rotating platform system with end fold up/down panels in the collapsed position.
Figure 10A:
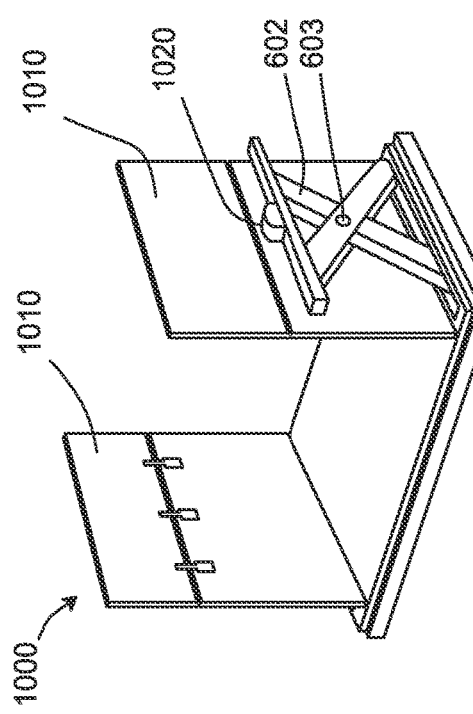
FIG. 10A depicts a basic rotating platform system with end fold up/down panels in the fully open and vertical position.
Figure 10C:
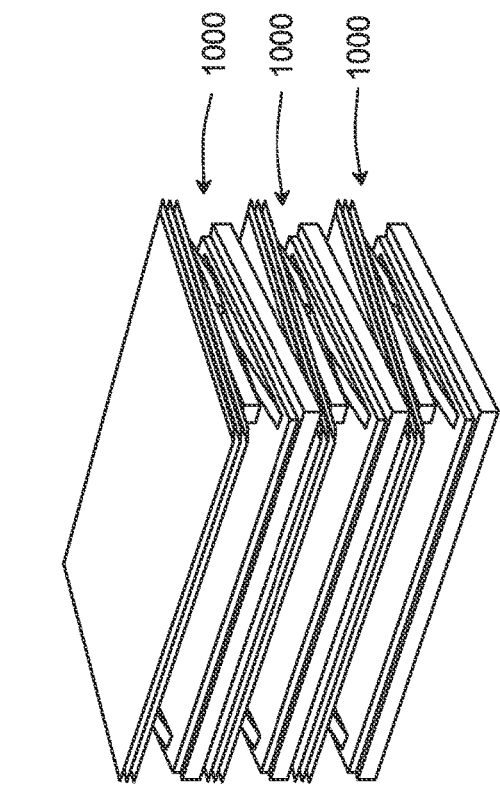
FIG. 10C depicts basic rotating platform system with end fold up/down panels stacked on top of each other.

FIGS. 10A-10C depicts an MTA, specifically a basic rotating platform system with vertical fold up/down panels 1000. FIG. 10A depicts a basic rotating platform system 1000 with end fold up/down panels 1010 in the fully vertical position. The basic rotating platform system 1000 may be packaged and/or deployed with one or more of various add-ons to configure the basic rotating platform system 1000 to be employed for a particular mission. As an example and not by way of limitation, the fold up/down panels 1010 may be used as protection for entryways. Additionally or alternatively, the fold up/down panels 1010 may be daisy-chained for decontamination, e.g., in instances where the rotating platform system 1000 is deployed to an area where individuals have been exposed to a contaminant. Additionally or alternatively, the fold up/down panels 1010 may be used as security entry-way checkpoints, e.g., in hard-toreach locations and/or by temporary stations. Additionally or alternatively, the fold up/down panels 1010 may include body scanners. Additionally or alternatively, as an example and not by way of limitation, the fold up/down panels 1010 may be RF shields. As an example and not by way of limitation, the fold up/down panels 1010 may be positioned to protect people and/or equipment from radiation and/or drones. As an example and not by way of limitation, the fold up/down panels 1010 may be angled to e.g., reflect energy and/or offer other protection to people and/or equipment. In particular embodiments, a slider 1020 may be used to move the end fold up/down panels 1010 from one side of the support structure 602 to the other. FIG. 10B depicts a basic rotating platform system 1000 with end fold up/down panels 1010 in the collapsed position. FIG. 10C depicts three basic rotating platform systems 1000 with end fold up/down panels collapsed and stacked on top of each other.

Figure 11:
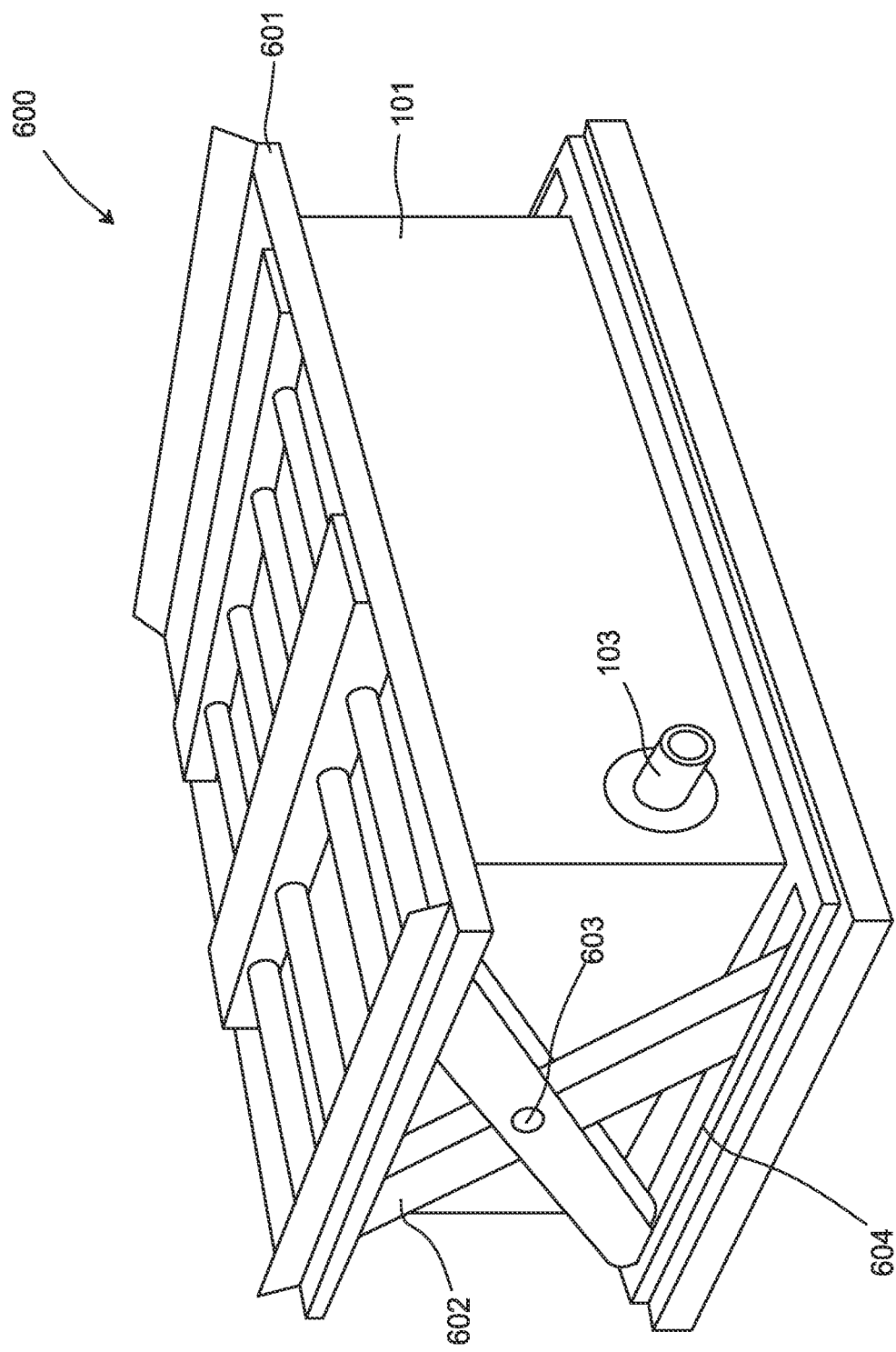
FIG. 11 depicts a modular bi-level storage and transport assembly with collapsible frame (MTA) fully expanded with a fluid bladder in the middle.

FIG. 11 depicts a modular bi-level storage and transport assembly with collapsible frame (MTA) 600 fully expanded with a fluid bladder 101 in the middle. As an example and not by way of limitation, the MTA 600 may include an upper rigid layer 601 and a lower rigid layer 604 connected by a support structure 602 with a locking mechanism 603, e.g., a pin, at one or more intersections. As an example but not by way of limitation, the fluid bladder 101 may have an interface manifold 103 for the input and/or output of fluids, slurries, or particulates.

Figure 12:
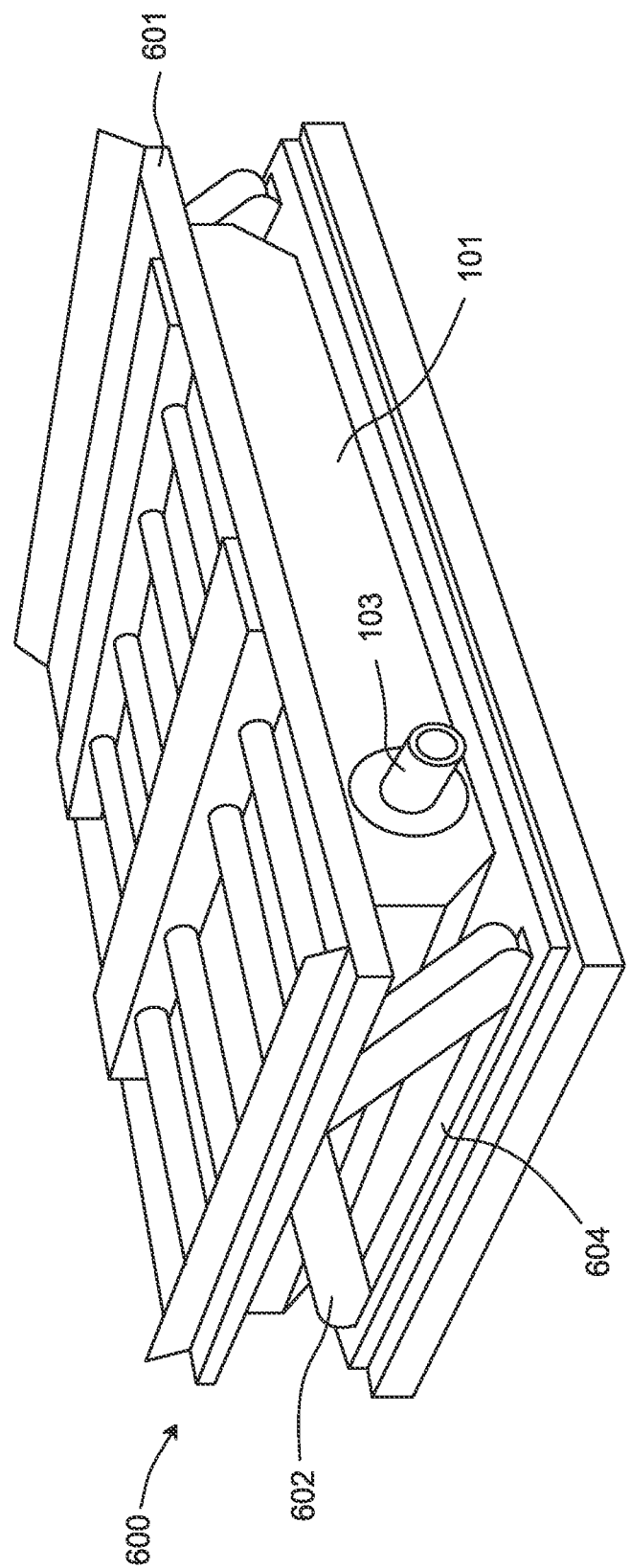
FIG. 12 depicts a modular bi-level storage and transport assembly with collapsible frame (MTA) and a fluid bladder in the middle with both assemblies collapsed.

FIG. 12 depicts a modular bi-level storage and transport assembly with collapsible frame (MTA) 600 collapsed with a fluid bladder 101 in the middle. As an example and not by way of limitation, the MTA 600 may include an upper rigid layer 601 and a lower rigid layer 604 connected by a support structure 602 with a locking mechanism 603, e.g., a pin, at one or more intersections. As an example but not by way of limitation, the fluid bladder 101 may have an interface manifold 103 for the input and/or output of fluids, slurries, or particulates. As an example and not by way of limitation, the upper rigid layer 601 and/or the lower rigid layer 604 are configurable with various military, commercial or custom tie-down fittings. In particular embodiments, the upper rigid layer 601 and/or the lower rigid layer are aircraft-compatible pallets. In particular embodiments, the upper rigid layer 601 and/or the lower rigid layer 604 is compatible with support mechanisms that allow lifting and transport, including lifting in a vertical plane and/or movement in a horizontal plane, by various material handling devices and vehicles. Such support mechanisms may include, e.g., slots, devises, rings, etc.

Figure 13:
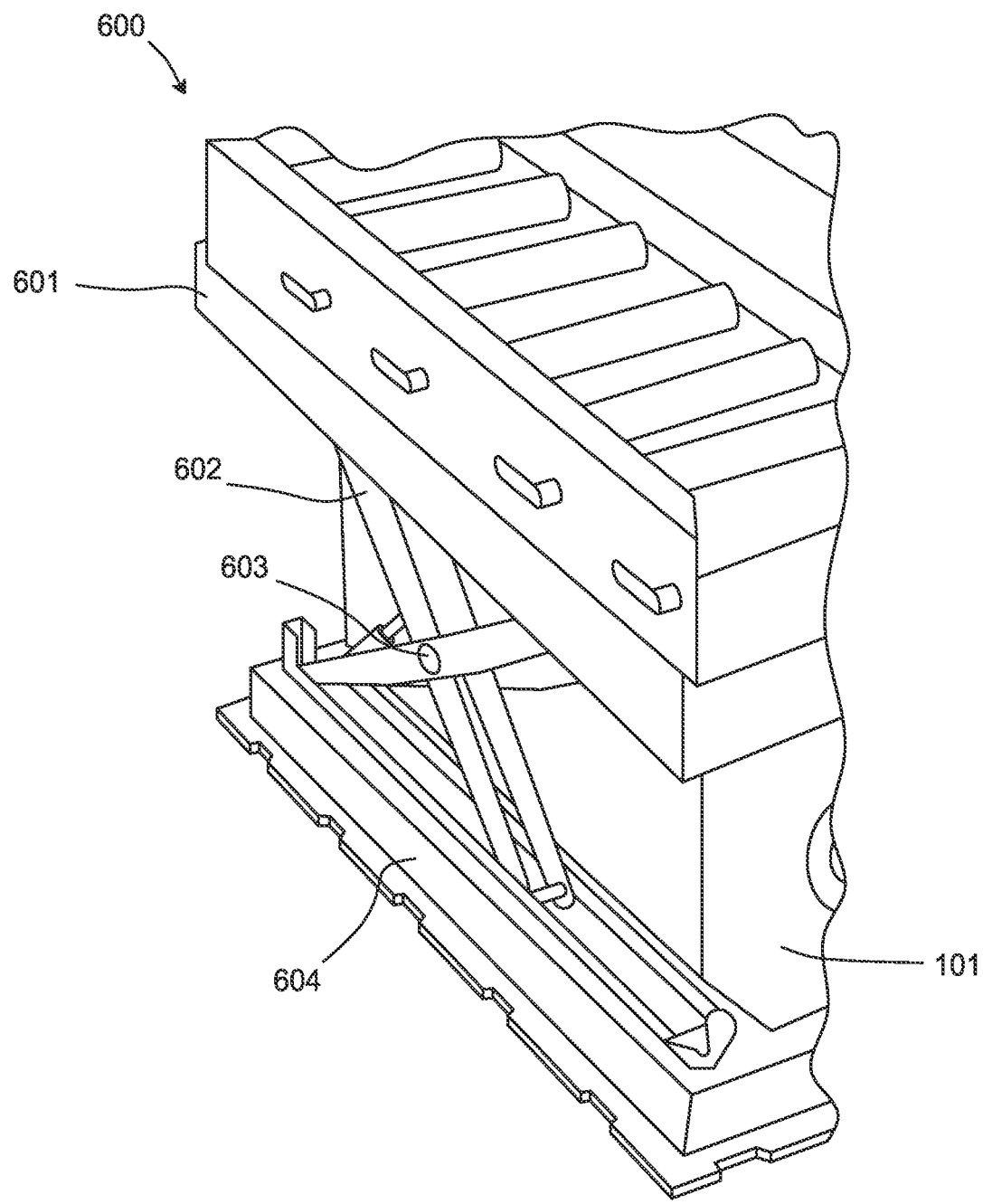
FIG. 13 depicts a blowup view of a modular bi-level storage and transport assembly with collapsible frame (MTA) with a focus on a support structure.

FIG. 13 depicts a blowup view of a modular bi-level storage and transport assembly with collapsible frame (MTA) 600 with a focus on a support structure 602, i.e., a scissor lift, that is part of the MTA 600. As an example and not by way of limitation, the MTA 600 may include an upper rigid layer 601 and a lower rigid layer 604 connected by a support structure 602 with a locking mechanism 603, e.g., a pin, at one or more intersections. As an example but not by way of limitation, the fluid bladder 101 may have an interface manifold 103 for the input and/or output of fluids, slurries, or particulates. As an example and not by way of limitation, the MTA 600 may include a support structure 602 that is affixed to each of any parallel side of the upper rigid layer 601 and the lower rigid layer 604. As an example and not by way of limitation, the support structure be motorized or manually-operated.

Figure 14:
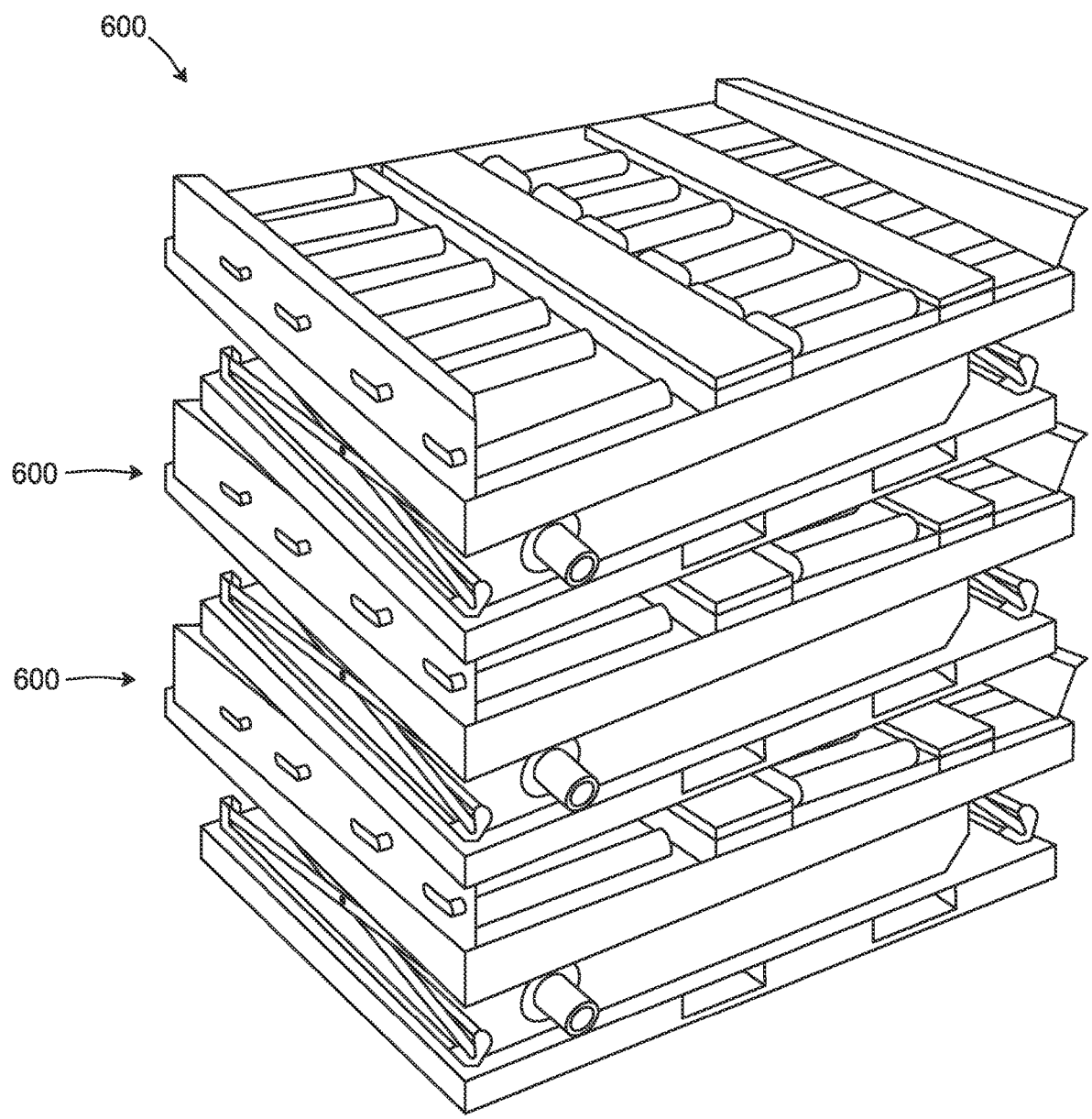
FIG. 14 depicts three modular bi-level storage and transport assemblies (MTAs) with fluid bladders in the middle of each and stacked on top of each other.

FIG. 14 depicts three modular bi-level storage and transport assemblies (MTAs) with fluid bladders 101 in the middle of each, collapsed and stacked on top of each other.

Figure 15A:
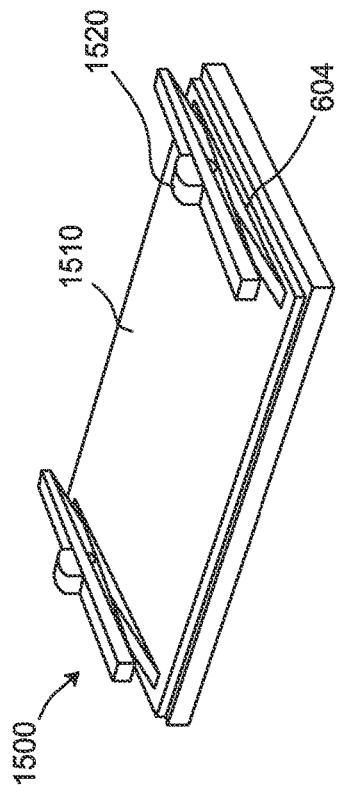
FIG. 15A depicts a containment system with a fragmentation shield in an angled position.
Figure 15B:
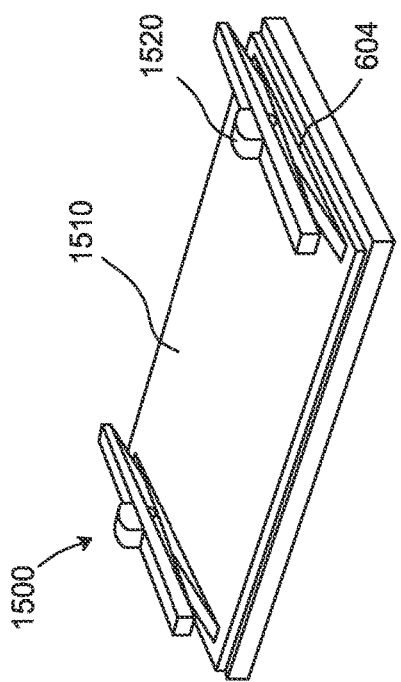
FIG. 15B depicts a containment system with a fragmentation shield folded up.

FIGS. 15A-15B depict example embodiments of an MTA, specifically a containment system with a fragmentation shield 1500. FIG. 15A depicts a containment system 1500 with a fragmentation shield 1510 in an angled position. As an example and not by way of limitation, the containment system 1500 may have a slider 1520 to move the fragmentation shield 1510 to different angles. FIG. 15B depicts a containment system 1500 with a fragmentation shield 1510 folded up, collapsed, and stacked on top of each other.

Figure 16A:
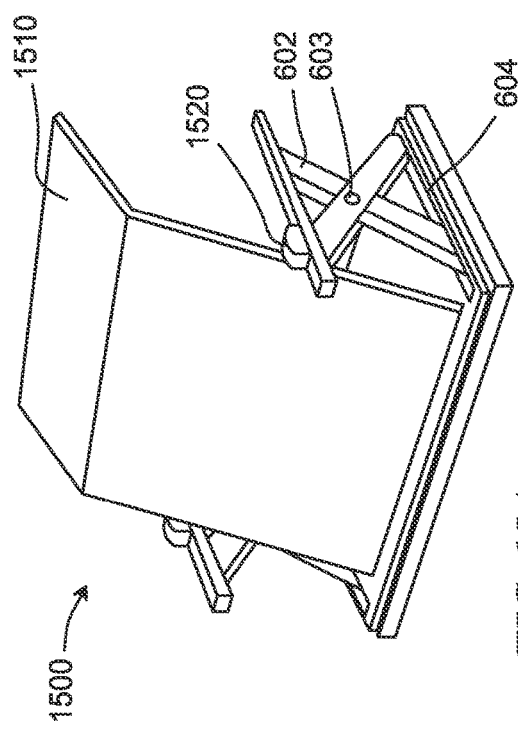
FIG. 16A depicts a containment system with a fragmentation shield in a vertical position.
Figure 16B:
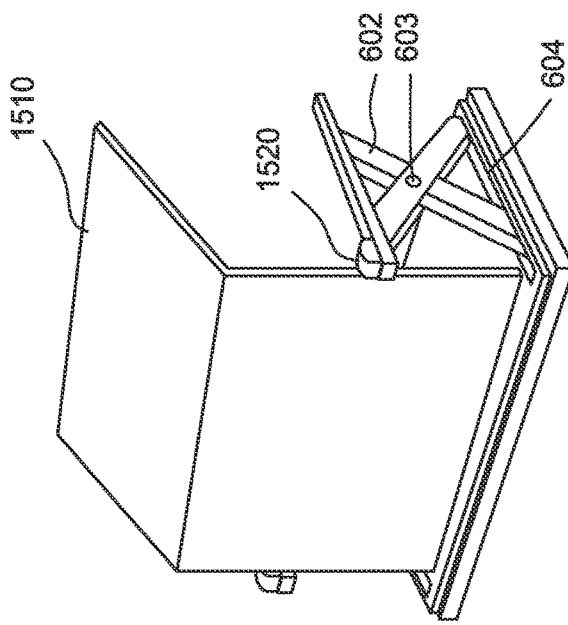
FIG. 16B depicts a containment system with a fragmentation shield collapsed.

FIGS. 16A-16B depict example embodiments of an MTA, specifically a containment system with a fragmentation shield 1600. FIG. 16A depicts a containment system 1600 with a fragmentation shield 1410 in a vertical position. As an example and not by way of limitation, the containment system 1600 may have a slider 1420 to move the fragmentation shield 1410 to different angles. FIG. 16B depicts a containment system 1600 with a fragmentation shield 1410 folded up, collapsed, and stacked on top of each other.

Figure 17A:
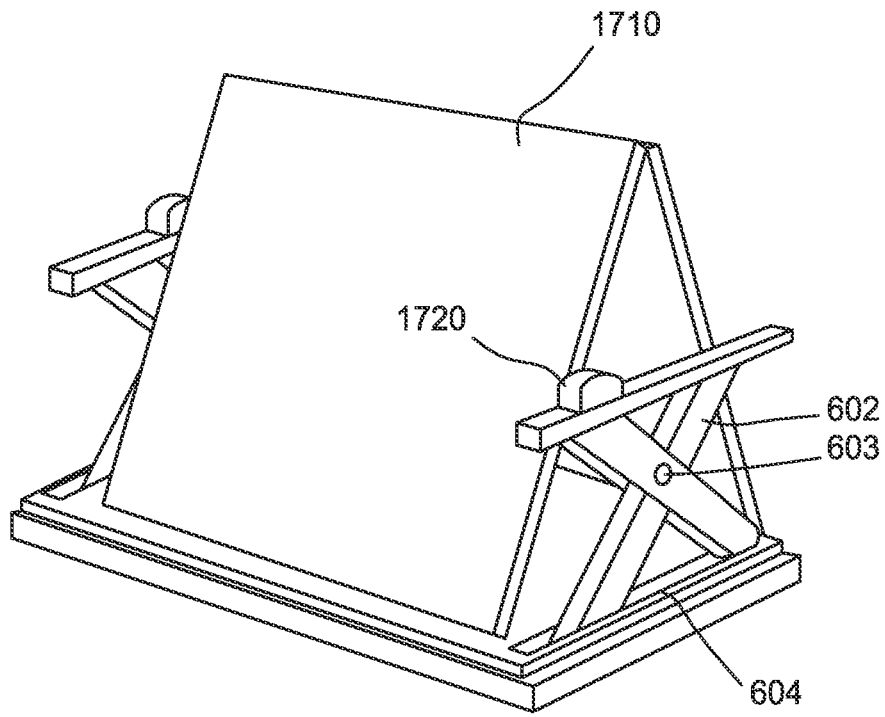
FIG. 17A depicts a containment system with a fragmentation shield in an upright A-Frame position.
Figure 17B:
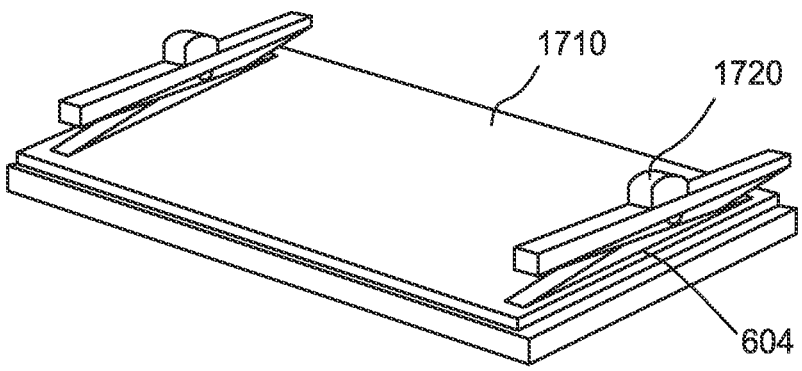
FIG. 17B depicts a containment system with a fragmentation shield collapsed.

FIGS. 17A-17B depict example embodiments of an MTA, specifically a containment system with a fragmentation shield 1700. FIG. 17A depicts a containment system 1700 with a slider 1720 and a fragmentation shield 1710 in an "A frame" position, where the upright position has portions of the fragmentation shield 1710 angled for maximum coverage of cargo stored in the containment system 1700 or as a more rigid barrier without any cargo inside. FIG. 17B depicts a containment system 1700 with a fragmentation shield 1710 folded up, allowing the containment system 1700 to be stacked with other MTAs.

Method of Operation

Figure 18:
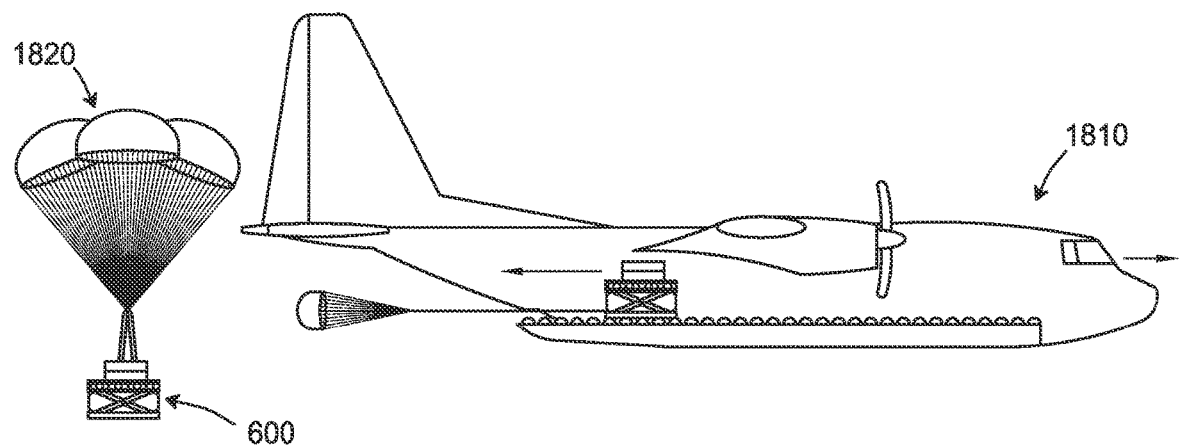
FIG. 18 depicts steps of the method of airdropping a modular bi-level storage and transport assembly (MTA).

FIG. 18 depicts steps of the method of airdropping a modular bi-level storage and transport assembly (MTA), specifically the changing location of an MTA 600 transported via aircraft 1810. As an example and not by way of limitation, a parachute 1820 may be attached to MTA 600 before or after the MTA 600 is detached from restraints which keep it in place while on the aircraft 1810. Additionally, at some time after detachment from restraints, MTA 600 and parachute 1820 may be dropped out of aircraft 1810. This may be done, for example, to deliver an MTA carrying vital fluids, equipment, and/or supplies to areas that are not easily accessible though other means.

Figure 19:
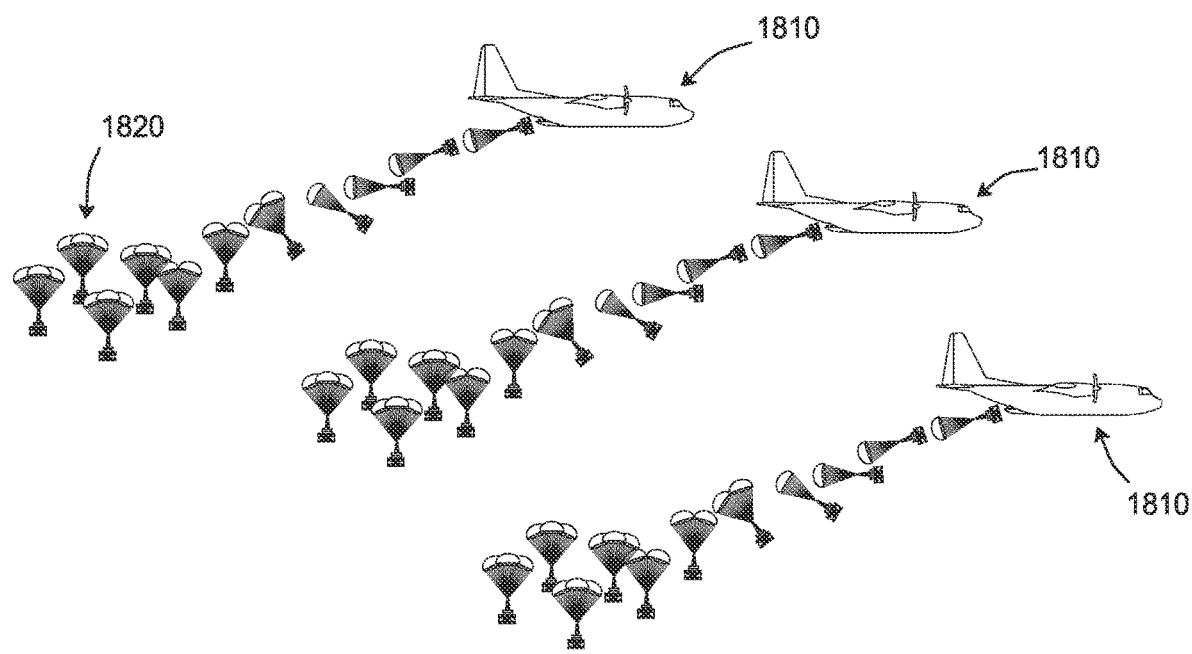
FIG. 19 depicts airdrop of multiple modular bi-level storage and transport assemblies (MTAs) attached to parachutes from various aircraft.

FIG. 19 depicts airdrop of multiple modular bi-level storage and transport assemblies (MTAs) 600 attached to parachutes 1820 from various aircraft 1810. Various aircraft 1810 may include one or more different types of aircraft. As an example and not by way of limitation, various aircraft 1810 can include both manned and unmanned aircraft. As an example and not by way of limitation, types of aircraft may further include both fixed wing and rotor wing, ground-effect aircraft, and hovercraft. As an example and not by way of limitation, airdrop may be done of multiple MTAs 1820 in rapid succession. Airdrop may be done to deliver fluids particulates, slurries, cargo, or other similar materials to, e.g., rural or isolated areas not suitable for aircraft 1810 to land. In particular embodiments, airdrop is done over land. In other embodiments, airdrop is done over the ocean or another body of water. As an example and not by way of limitation, additional features may be added to the MTA to assist with landing, break the fall of the MTA, and/or prevent the MTA from sinking. Other embodiments have additional features to prevent the MTA from sinking into soft surfaces, e.g., snow, mud, etc.

Figure 20:
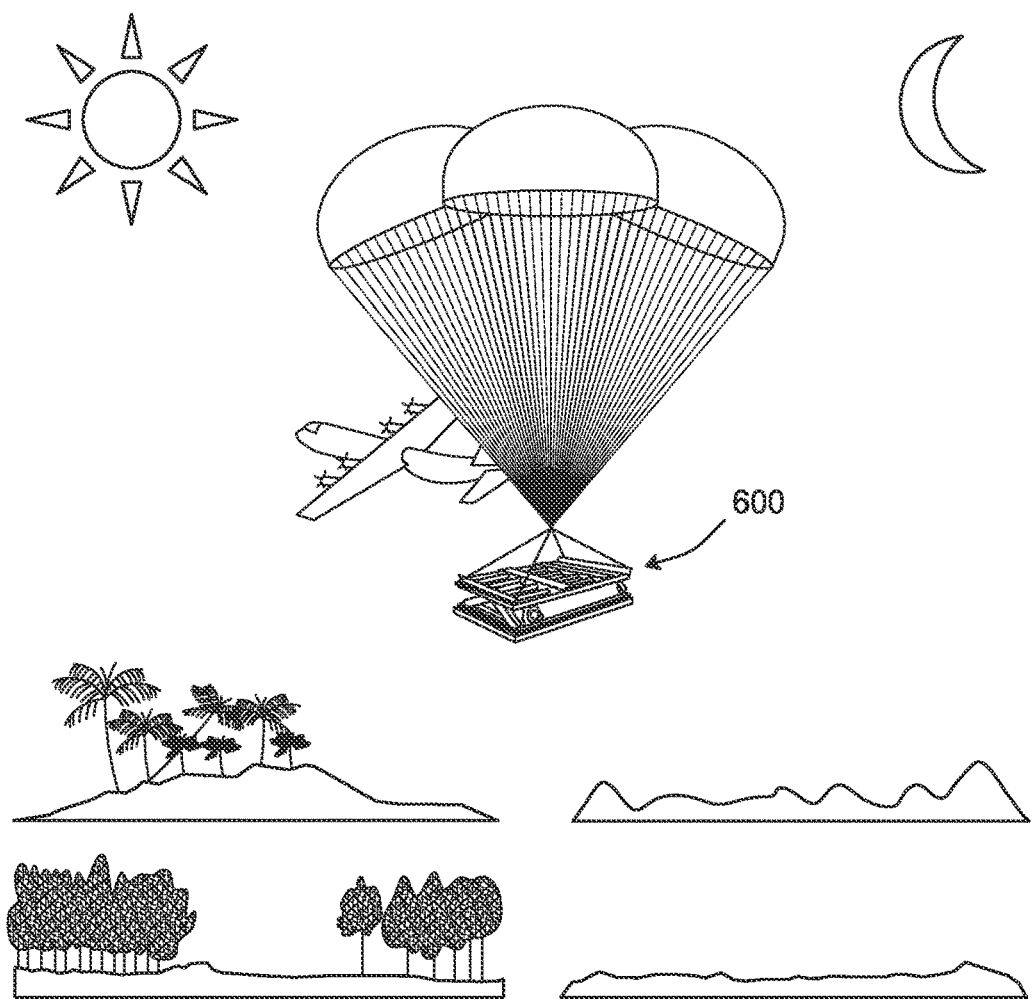
FIG. 20 depicts airdrop of a single modular bi-level storage and transport assembly (MTA) attached to a parachute.

FIG. 20 depicts airdrop of a single modular bi-level storage and transport assembly (MTA) 600 attached to a parachute 1820. As illustrated, airdrop may be done over austere environments, e.g., unlevel terrain or non-typical landing and airdrop areas with or without obstructions.

Figure 21:
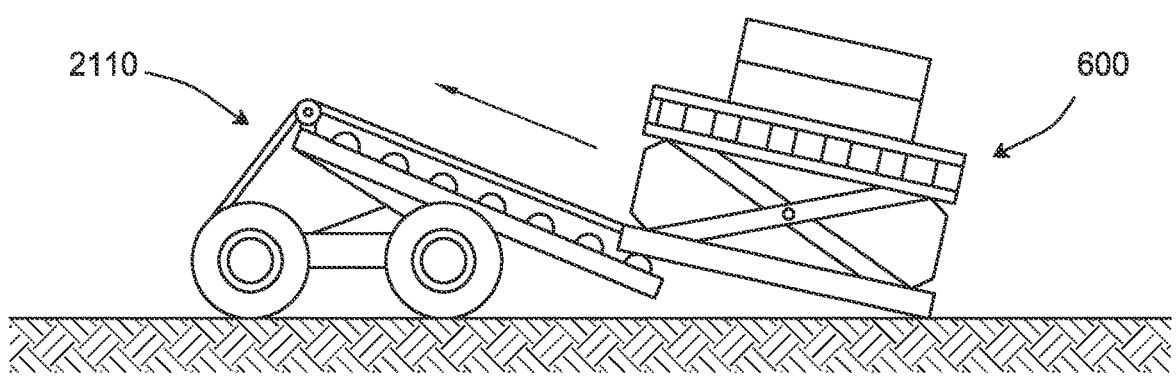
FIG. 21 depicts a transport mechanism lifting and loading a modular bi-level storage and transport assembly (MTA).

FIG. 21 depicts a transport mechanism 2110 lifting a modular bi-level storage and transport assembly (MTA) 600. As shown in FIG. 21, the transport mechanism 2110 may include a linear actuated tilting deck surface that can be independently or autonomously operated. This may be used to off-load cargo, where the off-loading is side or end off-loading. As an example and not by way of limitation, the lifting of the MTA may be done following airdrop. As an example and not by way of limitation, the lifting of the MTA may be done after the MTA 600 is rolled off an aircraft or ground vehicle.

FIG. 22 depicts a transport mechanism 2210 carrying a modular bi-level storage and transport assembly (MTA) 600. In particular, FIG. 22 illustrates a legacy transport mechanism, as an example. In particular embodiments, as shown in FIG. 22, the transport mechanism may be referred to as Materials Handling Equipment (MHE) and Ground Transport and be configured to transport one or more MTAs on the ground, e.g., after an airdrop. The transport mechanism may be configured to interface with the MTA. For example and not by way of limitation, interfaces on the transport mechanism may include forklift tines (as shown in FIG. 22), aircraft pallet dolly rollers/restraints, or K-loader (cargo loader) rollers/restraints. For example and not by way of limitation, interfaces on the MTA itself may include translation, restraints, physical mates, surface contact, fluid connections, and electrical connections. The legacy transport mechanism depicted in the figures of this disclosure is only one example of a transport mechanism that may be used as part of this invention. This disclosure contemplates using any relevant transport mechanism available for such a purpose. As an example and not by way of limitation, the transport mechanism 2210 may be unmanned and/or autonomous. As an example and not by way of limitation, the transport mechanism 2210 could be controlled by artificial intelligence (AI). This disclosure includes any suitable transport mechanisms, including, e.g., manned and unmanned vehicles, and includes evolving transport mechanisms.

In particular embodiments, an MTA 600 may be configured to interface with mission systems, e.g., with FARP hoses, pumps, and valve couplings, FAWPSS hoses, pumps, and valve couplings, and/or electrical connections. In particular embodiments, an MTA 600 may be configured to interface with air vehicles, e.g., using winch/snatch block hook, air delivery system (ADS), enhanced cargo handling system (EHCS), tie-down D-rings, and aircraft fuel systems, and/or electrical connections. In particular embodiments an MTA may be configured to interface with secondary cargo, e.g., using ramps, sliding surfaces, hard rolling surface, pneumatic wheels, aircraft pallet extrusion (rails and locks), cargo tie-down D-rings, and/or electrical connections.

As an example and not by way of limitation, in particular embodiments, the first transport mechanism may be a towable chassis assembly made of metal or composites and the towable chassis assembly may use interchangeable wheels, tracks, skis, or skids. Additionally or alternatively, the first transport mechanism may include a removable tow bar assembly connected to the chassis on a front or a rear end, and may further have a coupler located on a front or rear of the tow bar, whereby the coupler has interchangeable standard ball, pintle and loop, or custom connections. In particular embodiments, the transport mechanism may be designed to connect with one or more other transport mechanisms. To allow for this connection, the first transport mechanism may include a rear tow bar connection.

FIGS. 23-26 depict flowcharts illustrating different embodiments of steps that are part of a method for transporting a modular bi-level storage and transport assembly (MTA) 600. As an example and not by way of limitation, MTA 600 may include a dolly, a carrier, or a chassis. The method for transporting an MTA 600 may apply to every vehicle capable of transporting cargo, including manned and autonomous vehicles.

Figure 23:
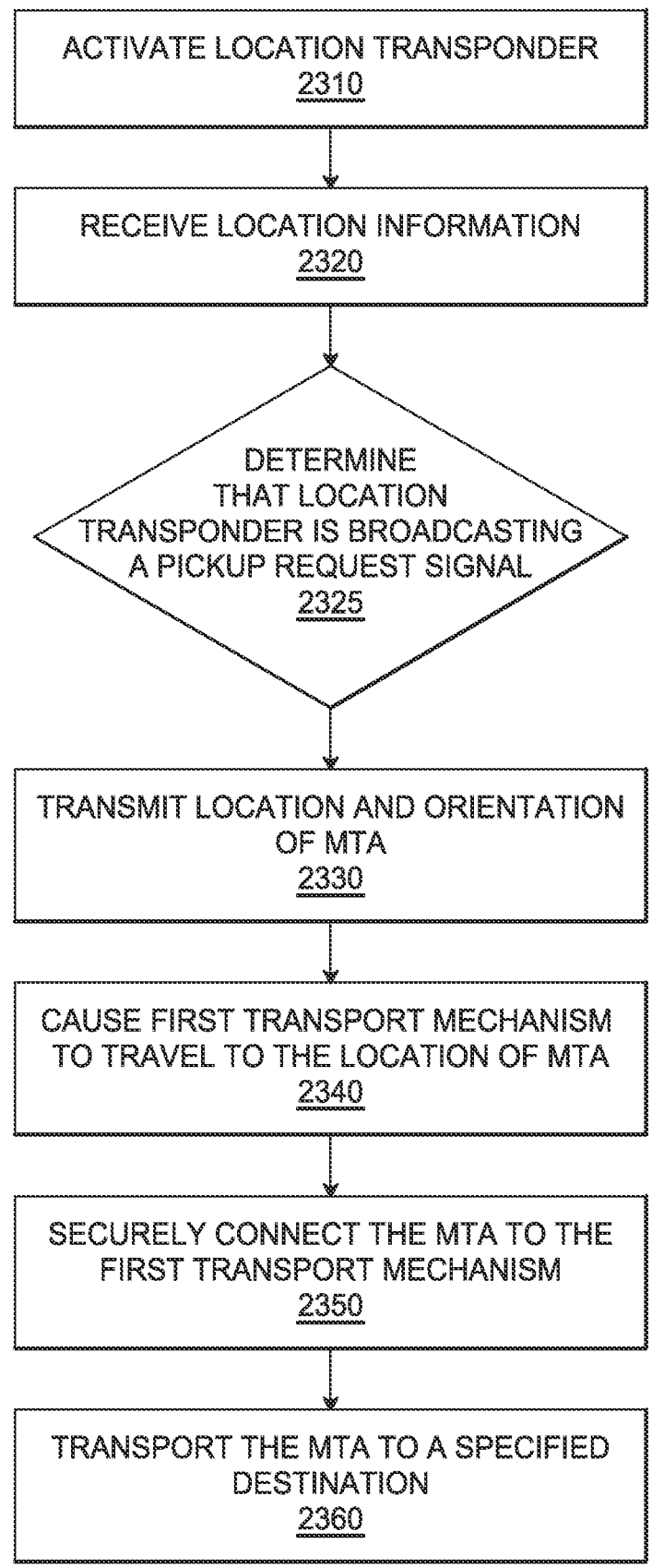
FIG. 23 depicts an embodiment of steps that are part of a method for transporting a modular bi-level storage and transport assembly (MTA).

As an example, and not by way of limitation, as illustrated in FIG. 23, a first step 2310 may be to activate a location transponder incorporated into the MTA. A second step 2320 may involve a first transport mechanism receiving location information from a location transponder that is incorporated into the MTA. A third step 2325 may involve determining that the location transponder is broadcasting a pickup request signal, which then causes, at fourth step 2330, transmitting a location and orientation of the MTA to the first transport mechanism. Fifth step 2340 may then involve causing the first transport mechanism to travel to the location of the MTA. Sixth step 2350 may involve securely connecting the MTA to the first transport mechanism. Seventh step 2360 may involve transporting the MTA to a specified destination using the first transport mechanism. Although this disclosure describes the steps of the claimed method being performed in a particular order and manner, this disclosure contemplates the method being performed in any suitable order and manner.

As an example and not by way of limitation, in particular embodiments, the MTA 600 interfaces to the dolly, carrier, or chassis via a coupling and loading mechanism using integrated connection points of the dolly, carrier, or chassis. In particular embodiments, securely connecting one transport mechanism to another is done by orienting one transport mechanism to align an aft connection interface of the transport mechanism with a forward connection interface of another transport mechanism and engaging the forward connection interface of the other transport mechanism to securely connect with the aft connection interface of the transport mechanism.

In particular embodiments, a transport mechanism raises the MTA 600 using interfaces to the dolly, the carrier, of the chassis off a surface of a resting or storage area. By way of example and not by way of limitation, the MTA may be securely connected to the transport mechanism by lifting the MTA using a plurality of arms connected to the transport mechanism and securely locking the MTA into a new position above an initial position.

The timing of when various mechanisms are activated and locations determined may vary in different embodiments. As an example and not by way of limitation, in particular embodiments, the specified destination may be programmed prior to receiving the location information of the MTA 600. In particular embodiments, the MTA 600 may be airdropped or removed (after landing) from an aerial vehicle before the location transponder is activated, and in other embodiments, the MTA 600 may be airdropped or removed (after landing) from the aerial vehicle after the location transponder is activated.

As an example and not by way of limitation, in particular embodiments, the MTA 600 is one of the plurality of MTAs, where the MTAs are coupled in a train configuration with one MTA being coupled to the first transport mechanism, which acts like an engine to drive the transport of multiple MTAs 600 at once. In particular embodiments, the transporting may be done along ground, rails, sea, or air. Furthermore, in particular embodiments, the first transport mechanism may be compatible with material handling equipment. The material handling equipment may be, e.g., forklifts, cranes, aircraft loaders, roller conveyances, large automated material handling systems, vehicle trailers, rail cars, unmanned systems, and/or optionally-manned systems.

As an example and not by way of limitation, in particular embodiments, the first transport mechanism includes a rigid platform which is attached to mechanisms which are in turn connected to the chassis. In particular embodiments, the upper surface of the rigid platform has modular fittings to attach other components, e.g., roller attachments, tie downs, and/or a cargo lock track system. These components may be used to hold the MTA in place when the first transport mechanism and MTA are moving.

In particular embodiments, various motors and computing systems may be used to enact the method described. For example and not by way of limitation, the chassis may include a Power Module (PM), a powered Winch Module (WM) with manual backup, and/or a Central Control Module (CCM). The PM may use, e.g., diesel, electric, diesel/electric, solar, electric battery, and/or non-traditional fuel to provide power for the first transport mechanism. The WM with manual backup may be used to pull cargo onto the modular rigid platform. In particular embodiments, the WM may include a cable assembly on a ratcheting drum with an electric motor and a manual crank system for non-powered operation or may include robotic arms. The CCM may be a computer system and software used to interface electronic subsystems on the chassis or a carried payload.

The method may further utilize a Tracking and Data Relay System (TDRS) module, where the TDRS module uses single or bidirectional RF links powered by the PM. The TDRS modules may be used to provide a line of sight over the horizon tracking of the location of the first transport mechanism. In particular embodiments, the TDRS module may be designed and built to interface to installed subsystems on the first transport mechanism or on a payload attached to the first transport mechanism for control, signal, data, video, audio, and/or telemetry. In particular embodiments, the TDRS module may further interface to the CCM for control, signal, data, video, audio, telemetry and similar purposes. As an example and not by way of limitation, in particular embodiments, the first transport mechanism may include a handheld control for local operation, an electrical plug for connection to a power module associated with the chassis, and/or an electrical plug for connection to the CCM for autonomous and remote operation.

In particular embodiments, the first transport mechanism may further include a Navigation Module (NM) and/or a Modular Airdrop Controller (MAC). The NM may be used for navigation and allow for autonomous navigation, line-of-sight navigation, and/or over-the-horizon remote control navigation. The MAC may be used to ensure a safe and accurate airdrop operation, e.g., by measuring atmosphere, navigation, and/or telemetry conditions and connecting to the CCM and the MTA. In further embodiments, the CCM may provide status and descent arresting mechanism status and receive data and commands. In response to, and based on, the receiving data and commands, a descent arresting mechanism may be steered.

In particular embodiments, the first transport mechanism may be powered by, e.g., the PM, an internal TDRS power source, and/or a payload power source, which payload power source may be on a payload which is attached to a rigid platform on the first transport mechanism. In the same or other embodiments, the first transport mechanism may include various input and output ports to allow attachment to a chassis, attached modules, and payloads. Furthermore, the method may involve using an internal computer module to perform power management and communicate with associated modules attached to the power module.

Figure 24:
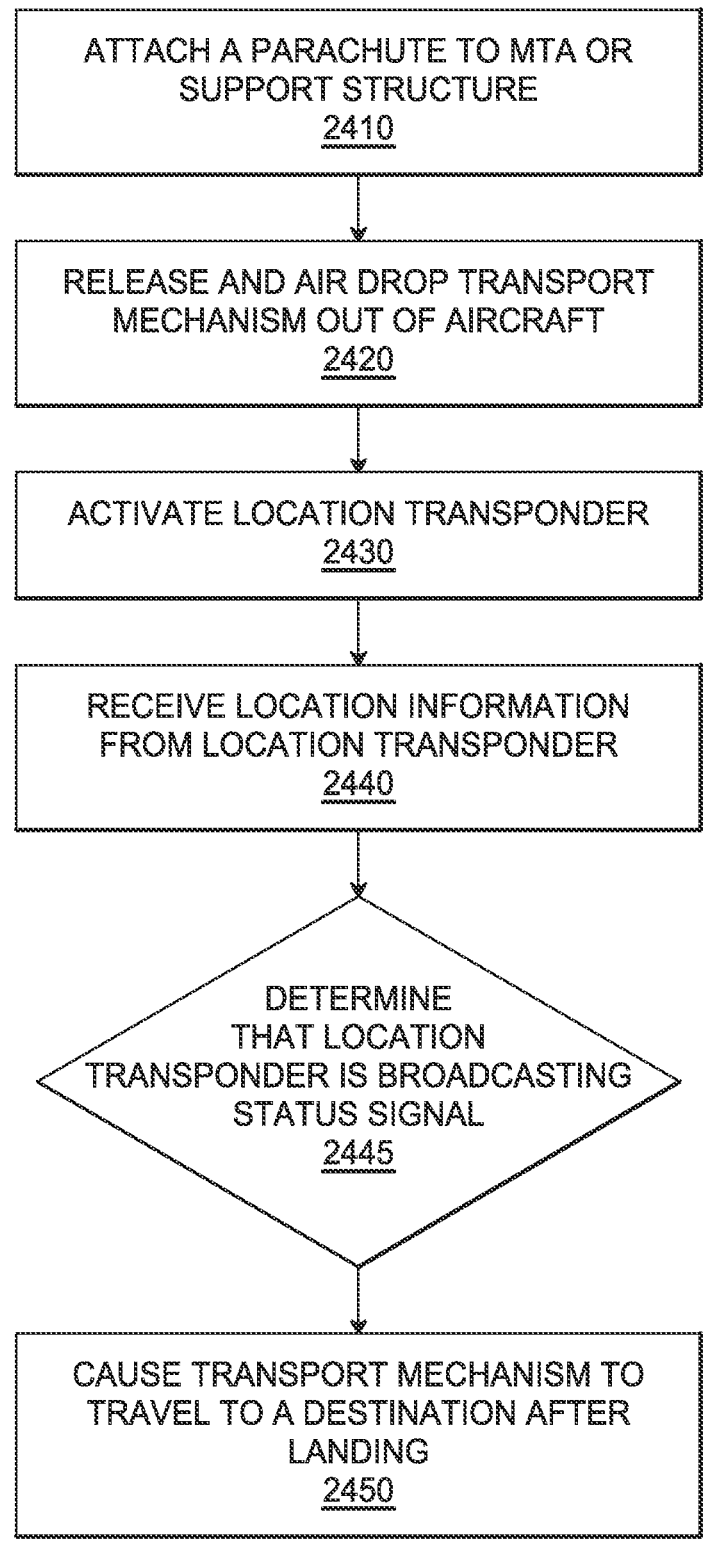
FIG. 24 depicts an embodiment of steps that are part of a method for transporting a modular bi-level storage and transport assembly (MTA).

As an example and not by way of limitation, as illustrated in FIG. 24, a first step 2410 in a method for dropping a transport mechanism from an aircraft includes attaching a parachute to an MTA, support structure, or transport mechanism. A second step 2420 may include releasing and air-dropping the transport mechanism or MTA out of the aircraft. This may be done by a crew or through autonomous means. A third step 2430 may include activating a location transponder that is incorporated into the MTA to allow location of the MTA, which may have been airdropped before or after airdrop of the transport mechanism. A fourth step 2440 may include receiving location information from the location transponder so the transport mechanism, or the person or computer controlling the transport mechanism, knows where to locate the MTA. A fifth step 2445 includes determining that the location transponder is broadcasting a status signal. If it is determined that the location transponder is not broadcasting a status signal, the system will keep searching until the signal is found. If it is determined that the location transponder is broadcasting a status signal, at a sixth step 2450, the method causes the transport mechanism to travel to a destination after landing. The steps of activating the transponder and determining location may begin before or after the transport mechanism has landed. Although this disclosure describes a method of dropping a transport mechanism from an aircraft in a particular manner, this disclosure contemplates a method of dropping a transport mechanism from an aircraft in any suitable manner.

In particular embodiments, in lieu of airdropping an MTA and/or transport mechanism, an aircraft may land, allowing the MTA and/or transport mechanism to roll off the aircraft, by remote or autonomous means.

Figure 25:
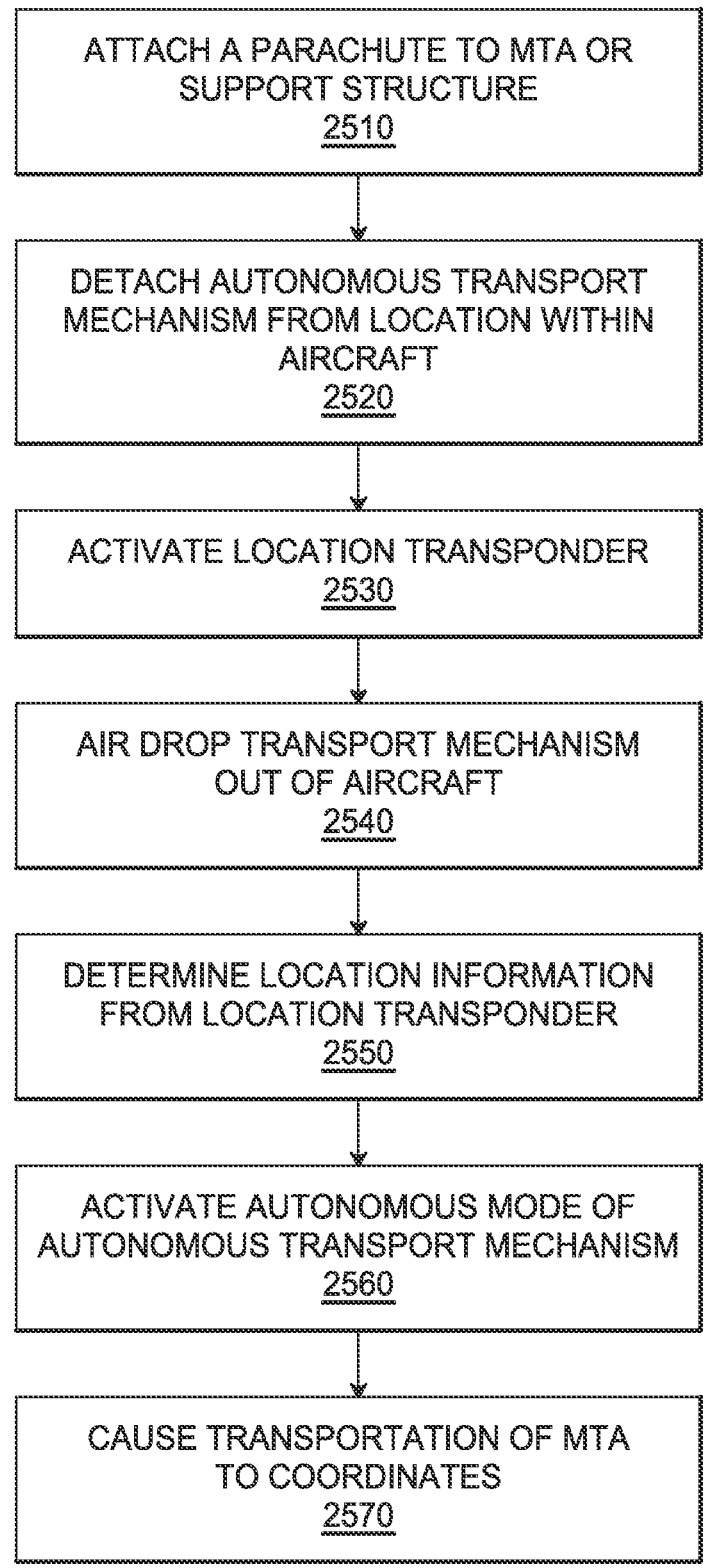
FIG. 25 depicts an embodiment of steps that are part of a method for transporting a modular bi-level storage and transport assembly (MTA).

As an example and not by way of limitation, FIG. 25 illustrates an embodiment of a method for airdropping an autonomous transport mechanism from an aircraft. A first step 2510 may include attaching a parachute to an MTA or support structure or autonomous transport mechanism, which step may be done at any time before airdrop, including before the MTA or autonomous transport mechanism is loaded onto the aircraft. A second step 2520 may include detaching the autonomous transport mechanism from a location within the aircraft. This may be done manually or autonomously. A third step 2530 may include activating a location transponder which is located in the MTA or autonomous transport mechanism to allow for tracking the location of either. A fourth step 2540 may include airdropping the MTA or autonomous transport mechanism out of the aircraft by any suitable means. A fifth step 2550 may include determining location information from the location transponder, which may include receiving and interpreting signals and translating into location coordinates. A sixth step 2560 may include activating an autonomous mode of the autonomous transport mechanism, which activating could be done through various means including but not limited to remote control, manual switches, and automatic sensors. Finally, a seventh step 2570 may include causing transportation of the autonomous transport mechanism to the MTA. Although this disclosure describes a method of airdropping an autonomous transport mechanism from an aircraft, this disclosure contemplates a method of airdropping an autonomous transport mechanism from an aircraft in any suitable manner. I As an example and not by way of limitation, the autonomous transport mechanism may include an engine which is started automatically upon the autonomous transport mechanism landing. The landing and subsequent transportation of the autonomous transport mechanism may be on the ground, where the dolly, carrier, or chassis has wheels or tracks attached to the bottom of their structure, or a surface that does not interface with the MTA. Alternatively, the landing and subsequent transportation of the autonomous transport mechanism may be in the water, where the dolly, carrier, or chassis includes a flotation and propulsion system attached to the bottom of the structure, or a surface that does not interface with the MTA. Furthermore, the autonomous transport mechanism may interface to the dolly, carrier or chassis via a coupling and loading mechanism. In particular embodiments, the coupling and loading mechanism may use integrated connection points of the dolly, carrier, or chassis.

The configuration of locating and transporting an MTA may vary in different embodiments. The MTA is picked up by a transport assembly, but when and how this is done may vary. As an example and not by way of limitation, the transport assembly may go to some location, either autonomously or in response to received directions and/or guidance, drop off the MTA, and pick up another MTA. In some embodiments, as an example and not by way of limitation, the transport mechanism may comprise a train that links MTAs together and moves the linked MTAs to another location at once. In some embodiments, as an example and not by way of limitation, several transport mechanisms may be used at once to pick up and put a train together or move several MTAs at one time. This may use a swarm-type technology. In any case, the transport mechanism will need to travel both to the MTA and to the specified drop-off location.

The timing and method of transmitting instructions and coordinates may vary in different embodiments. As an example and not by way of limitation, the autonomous transport mechanism may transmit video and audio data to a remote location during air dropping or the transportation that is done after landing on ground or water. As an example and not by way of limitation, the transportation of the MTA may be aided by providing instructions to the autonomous transport mechanism via a remote-control interface. The autonomous transport mechanism may be further aided in its maneuvers by containing a Navigation Module (NM), a Central Control Module (CCM), and/or a Tracking and Data Relay System (TDRS) module. As an example and not by way of limitation, the NM may include an inertial navigation unit (INU), inertial measurement unit (IMU), Synthetic Aperture Radar (SAR), GPS receivers, LIDAR, VIDAR, visual cameras, and/or IR cameras. This may aid in either autonomous or remote control of the transport mechanism. As an example and not by way of limitation, the CCM may be a ruggedized computer with configurable memory and software to control all systems and storage. The TDRS module may be a bi-directional secure line of sight radio system, a bi-directional secure satellite communications system, a line of sight antenna system, and/or an over-the-horizon satellite antenna system, or use line of sight or beyond line of sight laser communications. As an example and not by way of limitation, the MTA may deactivate autonomous mode responsive to a predetermined circumstance that is programmed into the CCM. In particular embodiments, the autonomous transport mechanism may be electrically connected to the CCM, which connection may be done by either autonomous automatic electrical connections or human performed electrical connections. Additionally or alternatively, the NM may provide data to the CCM. Similarly, the autonomous transport mechanism may include input/output electrical connections to attach a Navigation Module (NM), a Tracking and Data Relay System (TDRS) module, a Winch Module (WM), a chassis drive and steering system, a Modular Airdrop Controller (MAC), and/or attached cargo payloads.

As an example and not by way of limitation, the TDRS may be used to aid in autonomous transport and navigation. In particular embodiments, the TDRS module may electrically communicate with the CCM and relay video, audio, data and/or telemetry to the CCM. In particular embodiments, the TDRS may receive geographic positional information, either from a line of sight associated with the CCM or through the over-the-horizon satellite system and transmitting the geographic positional information.

Figure 26:
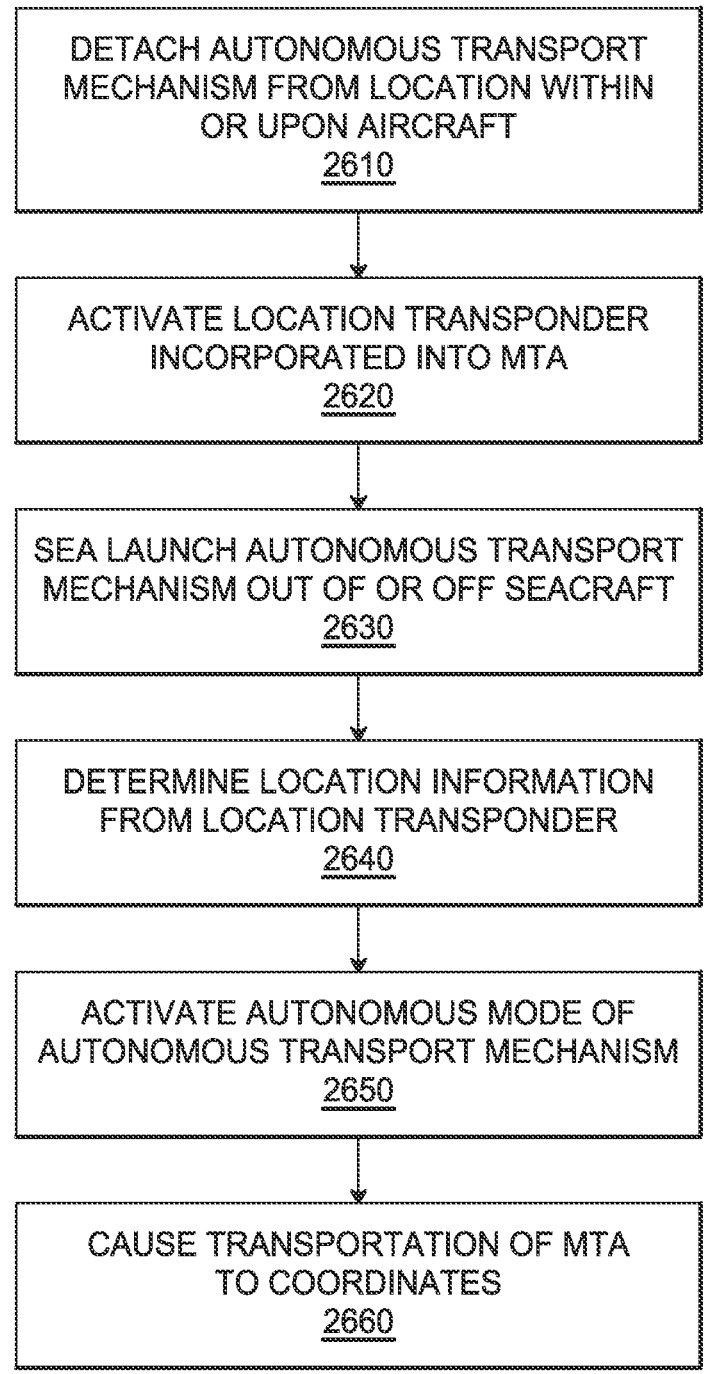
FIG. 26 depicts an embodiment of steps that are part of a method for transporting a modular bi-level storage and transport assembly (MTA).

As an example and not by way of limitation, FIG. 26 illustrates an embodiment of a method for transporting an autonomous transport mechanism from a seacraft amphibiously. In a first step 2610, the autonomous transport mechanism may be detached from a location within or upon the seacraft. In a second step 2620, a location transponder that is incorporated into the MTA or transport mechanism may be activated. In a third step 2630, the autonomous transport mechanism may be launched out of or off the seacraft. In a fourth step 2640, the location information of the MTA or transport mechanism may be determined from the location transponder. In a fifth step 2650, an autonomous mode of the autonomous transport mechanism may be activated, e.g., by a switch, remote means, and/or a sensor. In a sixth step 2660, the transport mechanism is transported to or with an MTA according to predetermined or received coordinates. Although this disclosure describes a method of transporting an amphibious autonomous transport mechanism using a seacraft, this disclosure contemplates a method of transporting an amphibious autonomous transport mechanism and launching from a seacraft in any suitable manner.

As an example and not by way of limitation, the autonomous transport mechanism may include an engine, where the engine starts automatically upon sea launch of the autonomous transport mechanism. In particular embodiments, the autonomous transport mechanism may be designed for sea and/or water transport, e.g., the dolly, carrier, or chassis may include a seafaring collapsible or rigid hull and propulsion system attached to a bottom surface or a surface that does not interfere with the MTA.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A modular bi-level storage and transport assembly (MTA) for loading onto a transport vehicle, comprising:
    an upper rigid layer and a lower rigid layer; and
    an adjustable support mechanism coupled to the upper rigid layer and lower rigid layer, wherein:
        the support mechanism is operable to expand to increase a distance between the upper rigid layer and lower rigid layer, thereby expanding the MTA and forming a space between the upper rigid layer and the lower rigid layer,
        the support mechanism is operable to contract to reduce the distance between the upper rigid layer and the lower rigid layer, thereby collapsing the MTA,
        the space formed between the upper rigid layer and the lower rigid layer is configured to receive a containment vessel, wherein the containment vessel is removably attached to the upper rigid layer and the lower rigid layer, and
        the lower rigid layer is configured to interface with a matching upper rigid layer of a matching MTA, allowing the matching MTA to securely mate with the MTA.

2. The MTA of claim 1, wherein the adjustable support mechanism comprises a plurality of interlocking frame segments.

3. The MTA of claim 2, further comprising one or more locking components placed at one or more intersections between two of the plurality of the interlocking frame segments and the upper rigid layer or the lower rigid layer.

4. The MTA of claim 3, wherein the one or more locking components are removable or adjustable mechanisms.

5. The MTA of claim 1, wherein the adjustable support mechanism has one end operable to slide along a defined mechanical path on either the upper rigid layer or the lower rigid layer.

6. The MTA of claim 5, comprising one or more receiving structures for a locking component placed at one or more positions along the mechanical path.

7. The MTA of claim 5, wherein the containment vessel is a flexible bladder comprising a collapsible membrane, wherein the membrane is operable to automatically collapse to decrease a volume of the flexible bladder when contents are removed from the bladder; and the MTA further comprising:
    a plurality of straps coupled to collapsible vertical supports attached to the upper rigid layer and the lower rigid layer; and
    a tightening mechanism attached to the plurality of straps that is operable to restrain the containment vessel between the upper rigid layer and the lower rigid layer as the MTA collapses.

8. The MTA of claim 1, further comprising:
    a plurality of straps coupled to the upper rigid layer and the lower rigid layer; and
    a tightening mechanism attached to the plurality of straps that is operable to restrain the containment vessel between the upper rigid layer and the lower rigid layer as the MTA collapses.

9. The MTA of claim 1, further comprising a shock absorber system attached to at least one of the lower rigid layer or the upper rigid layer, wherein the shock absorber system comprises at least one of:
    collapsible honeycomb cardboard blocks,
    air bags,
    open or closed cell foams,
    metallic or composite foils,
    reaction jets,
    pyrotechnic rockets,
    a vertical controlled descent and lift system, or
    a vertical descent arresting system.

10. The MTA of claim 1, wherein the upper rigid layer is configured to allow, on top of the upper rigid layer, storage of at least one of a rigid containment vessel, an Aircraft compatible pallet, or general cargo.

11. The MTA of claim 1, wherein the lower rigid layer is configured to secure to an interior surface of at least one of an aircraft, a sea-based transport vehicle, or a ground-based transport vehicle.

12. The MTA of claim 1, wherein at least one of the upper rigid layer or the lower rigid layer is configured to secure to a sling to enable sling loading via at least one of a vertical lift aircraft or other cargo transport and handling vehicles.

13. The MTA of claim 1, wherein at least one of the upper rigid layer or the lower rigid layer is configured to secure to parachute rigging for aircraft airdrop capability.

14. The MTA of claim 1, wherein the upper rigid layer is operable to rotate or translate and is further operable to be locked in various positions by one or more locking mechanisms.

15. The MTA of claim 14, further comprising:
    when the upper rigid layer is in a vertical or horizontal position, a containment vessel or cargo space on top of the upper rigid layer; and
    wherein the upper rigid layer is operable to be set and locked in intermediate angular positions between a horizontal axis and a vertical axis, wherein the horizontal axis and the vertical axis are set in relation to the lower rigid layer.

16. The MTA of claim 1, further comprising at least one of a removable exterior hard covering or a removable exterior soft covering, wherein at least one of the removable exterior hard covering or the removable exterior soft covering is attached to the upper rigid layer or the lower rigid layer via at least one of frames or existing features on the MTA.

17. The MTA of claim 16, wherein the removable exterior hard covering or the removable exterior soft covering is waterproof and comprises removable material that is at least one of ballistic, non-ballistic or fireproof.

18. The MTA of claim 17, wherein the removable exterior hard covering is operable to articulate in various axes either manually or using at least one of electrical actuators, hydraulic actuators, or pneumatic actuators, wherein the electrical actuators, the hydraulic actuators, or the pneumatic actuators are controlled by at least one of an on-board control device, a remote control device, or an autonomous control device.

19. The MTA of claim 1, wherein the MTA is configured with one or more of an electrical actuator, a hydraulic actuator, or a pneumatic actuator for remote or autonomous operation.

20. The MTA of claim 1, wherein the upper rigid layer and the lower rigid layer are configurable with various military, commercial or custom tie down fittings.

21. The MTA of claim 1, wherein at least one of the upper rigid layer or the lower rigid layer comprise aircraft compatible pallets.

22. The MTA of claim 1, wherein at least one of the upper rigid layer or the lower rigid layer is compatible with support mechanisms that allow at least one of lifting in a vertical plane or movement in a horizontal plane by various material handling devices and vehicles.

23. A collapsible semi-rigid storage unit for loading onto a transport vehicle, comprising:
  a modular bi-level storage and transport assembly (MTA) comprising:
  an upper rigid layer and a lower rigid layer; and
  a scissor lift coupled to the upper rigid layer and the lower rigid layer, wherein:
    the scissor lift is operable to expand to increase a distance between the upper rigid layer and the lower rigid layer, thereby expanding the MTA and forming a space between the upper rigid layer and the lower rigid layer, and
    the scissor lift is operable to contract to reduce the distance between the upper rigid layer and the lower rigid layer, thereby collapsing the MTA;
  a semi-rigid containment vessel stored in the space formed between the upper rigid layer and the lower rigid layer, wherein the containment vessel is removably attached to the upper rigid layer and the lower rigid layer, and
  the lower rigid layer is configured to interface with a matching upper rigid layer of a matching MTA.

24. The collapsible storage unit of claim 23, further comprising one or more locking components placed at one or more intersections between two frame segments of a plurality of interlocking frame segments within the scissor lift.

25. The collapsible storage unit of claim 23, wherein the scissor lift has one end operable to slide along a defined mechanical path, wherein the defined mechanical path is on either the upper rigid layer or the lower rigid layer.

26. The collapsible storage unit of claim 23, wherein the semi-rigid containment vessel comprises a collapsible outer shell.

27. The collapsible storage unit of claim 26, wherein the collapsible outer shell is operable to, as contents are removed from the semi-rigid containment vessel,
  automatically collapses to decrease a volume of the semi-rigid containment vessel, and further comprising:
    a plurality of straps coupled to the upper rigid layer and the lower rigid layer; and
    a tightening mechanism attached to the plurality of straps that is configured to restrain the semi-rigid containment vessel between the upper rigid layer and the lower rigid layer as the MTA collapses.

28. A modular bi-level storage and transport assembly (MTA) for loading onto and attaching to an aircraft comprising:
  an upper rigid layer and a lower rigid layer; and
  an adjustable support mechanism coupled to the upper rigid layer and the lower rigid layer, wherein:
    the support mechanism is operable to expand to increase a distance between the upper rigid layer and the lower rigid layer, thereby expanding the MTA and forming a space between the upper rigid layer and the lower rigid layer, and
    the support mechanism is operable to contract to reduce the distance between the upper rigid layer and the lower rigid layer, thereby collapsing the MTA;
  a containment vessel, wherein the containment vessel is configured to be stored in the space formed between the upper rigid layer and the lower rigid layer, wherein the containment vessel is removably attached to the upper rigid layer and the lower rigid layer; wherein the lower rigid layer is coupled to an inboard surface of the aircraft, and
  the lower rigid layer is configured to interface with a matching upper rigid layer of a matching MTA.

29. The MTA of claim 28, further comprising one or more locking components placed at one or more intersections between at least two frame segments of a plurality of interlocking frame segments in the adjustable support mechanism.

30. The MTA of claim 28, wherein the containment vessel is a flexible bladder comprising a collapsible outer shell.

31. A set of modular bi-level storage and transport assemblies (MTAs) for loading into a transport vehicle, comprising:
  a first MTA comprising:
    a first upper rigid layer and a first lower rigid layer; and
    an adjustable first support mechanism coupled to the first upper rigid layer and the first lower rigid layer, wherein:
      the first support mechanism is operable to expand to increase a distance between the first upper rigid layer and first lower rigid layer, thereby expanding the first MTA and forming a space between the first upper rigid layer and the first lower rigid layer,
      the first support mechanism is operable to contract to reduce the distance between the first upper rigid layer and the first lower rigid layer, thereby collapsing the first MTA, and
      a first containment vessel is removable from the first MTA; and
  a second MTA, wherein the second MTA has features identical to the first MTA, and wherein a second lower rigid layer of the second MTA is configured to interface with the first upper rigid layer of the first MTA.

* * * * *